(12) United States Patent
Steckelberg et al.

(10) Patent No.: US 6,464,734 B1
(45) Date of Patent: Oct. 15, 2002

(54) DEEP BLACK DYE MIXTURES OF FIBER-REACTIVE AZO DYES

(75) Inventors: Joachim Steckelberg, Hofheim; Ronald Pedemonte, Eppstein-Vockenhausen; Manfred Hoppe, Kürten, all of (DE)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 0 days.

(21) Appl. No.: 09/524,057

(22) Filed: Mar. 13, 2000

(51) Int. Cl.[7] .......................... C09B 67/24; D06P 1/384
(52) U.S. Cl. ....................... 8/549; 8/641; 8/924; 8/918
(58) Field of Search ........................... 8/549, 641, 918, 8/924

(56) References Cited

U.S. PATENT DOCUMENTS

| | | |
|---|---|---|
| 2,657,205 A | 10/1953 | Heyna et al. |
| 4,134,887 A | 1/1979 | Fuchs et al. |
| 4,257,770 A | 3/1981 | Nishimura et al. |
| 4,283,196 A | 8/1981 | Wenghoefer et al. |
| 4,448,583 A * | 5/1984 | Corso |
| 4,581,036 A * | 4/1986 | Opitz et al. |
| 4,703,112 A | 10/1987 | Mischke et al. |
| 5,216,138 A | 6/1993 | Dannheim |
| 5,432,266 A * | 7/1995 | Herd et al. |
| 5,445,654 A | 8/1995 | Hussong et al. |
| 5,502,174 A | 3/1996 | Ehrenberg et al. |
| 5,611,821 A | 3/1997 | Huang et al. |
| 5,690,698 A | 11/1997 | Von Der Eltz et al. ......... 8/532 |
| 6,086,639 A * | 7/2000 | Steckelberg et al. |
| 6,106,580 A | 8/2000 | Steckelberg .................. 8/546 |

FOREIGN PATENT DOCUMENTS

| | | |
|---|---|---|
| BE | 861220 | 5/1978 |
| DE | 1911427 | 9/1970 |
| DE | 2351970 | 5/1975 |
| DE | 2362683 | 6/1975 |
| DE | 3134357 | 3/1983 |
| DE | 3537260 | 4/1987 |
| DE | 4329421 | 3/1995 |
| EP | 489360 | 6/1992 |
| EP | 668 328 | 8/1995 |
| EP | 679 697 | 11/1995 |
| EP | 731 145 | 9/1996 |
| EP | 982 374 | 3/2000 |
| GB | 1302519 | 1/1973 |
| GB | 1561944 | 3/1980 |
| JP | 7406798 | 2/1974 |
| JP | 49050291 | 5/1974 |
| JP | 58160362 | 9/1983 |
| KR | 94/2560 B1 | 3/1994 |
| WO | 01/00736 | 1/2001 |

OTHER PUBLICATIONS

H. Rath, Lehrbuch der Textilchemie, Springer–Verlag, 3rd Edition (1972), p. 295–299.

R.R.D. Holt, Introduction to Superwash Wool—Hercosett Process, (1975), p.38–44.

Lewis et al. "Proceedings of the Society, Production of Fast Dyeings on Resin–treated Wool," *Journal Of The Society of Dyers and Colourists,* 88(3): pps.93–100 (Mar. 1972).

Bellhouse, E., "Proceedings, Machine Washable Wool Dye Selection and Dyeing Methods," *Journal Of The Society of Dyers and Colourists:*pps. 33–44 (Feb. 1975).

\* cited by examiner

*Primary Examiner*—Margaret Einsmann
(74) *Attorney, Agent, or Firm*—Connolly Bove Lodge & Hutz LLP

(57) ABSTRACT

The present invention claims a dye mixture comprising at least one dyestuff of the general formula (1)

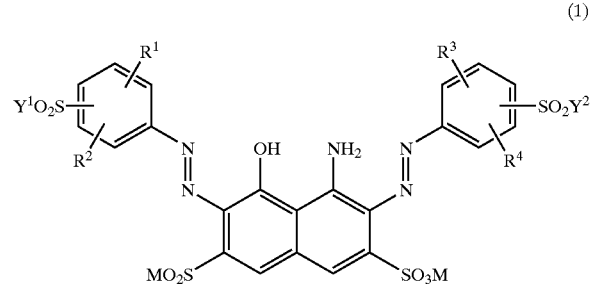

(1)

and at least one dyestuff of the general formula (2)

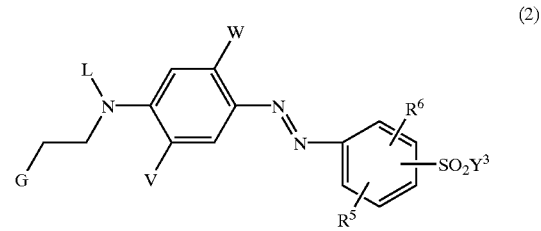

(2)

where

M, $Y^1$, $Y^2$, $Y^3$, $R^1$, $R^2$, $R^3$, $R^4$, $R^5$, $R^6$, W, V, L and G are defined as given in claim 1, a process for its preparation and its use for dyeing and printing hydroxyl-and/or carboxamido-containing material.

11 Claims, No Drawings

DEEP BLACK DYE MIXTURES OF FIBER-REACTIVE AZO DYES

The present invention relates to the field of fiber-reactive dyes. Black-dyeing mixtures of fiber-reactive dyes are known from U.S. Pat. No. 5,445,654 and U.S. Pat. No. 5,611,821 as well as from KR 94-2560-B1. Deep black dye mixtures are known, for example, from JP-A Sho-58-160 362 which are based on a navy-blue disazo dye and an orange monoazo dye. However, these dye mixtures have some deficiencies, in particular the washfastness to repeated washings is unfavorable.

Dyes according to the general formula (1) below are already known from, for example, U.S. Pat. No. 2,657,205, JP-A Sho-58-160 362 and U.S. Pat. No. 4,257,770 and the references cited therein.

Monoazo dyes of the general formula (2) below are already known as well, for example from DE-A 3537260, JP-A 7406798, JP-A 4950291, DE-A 2351970, DE-A 2362 683, BE-A 861220 and U.S. Pat. No. 4,283,196. However, these orange dyes generally have poor wash and chlorine fastnesses and do not build up well.

The inventors of the present invention have surprisingly found now that the washfastness and build up properties of deep black dye mixtures according to the documents mentioned above can be improved by replacing their orange components by the monoazo dyes of the general formula (2). As the washfastness properties of said deep black dye mixtures are generally limited by the washfastness of the orange. component, a skilled person would not have expected that dyes of the general formula (2) would be suitable for improving such properties in view of their disadvantages when used individually.

The present invention claims dye mixtures comprising one or more dyestuffs of the general formula (1)

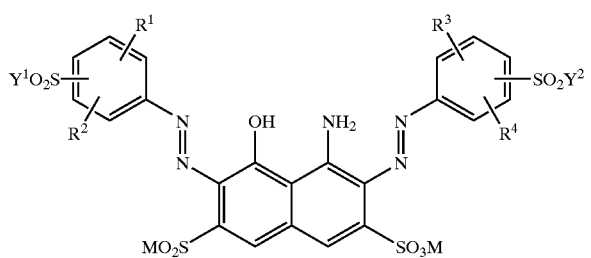

(1)

and one or more dyestuffs of the general formula (2)

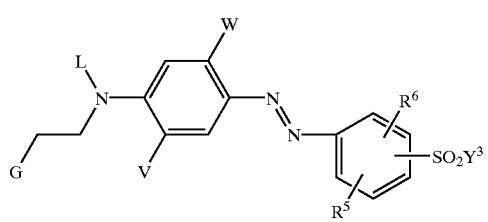

(2)

where

M is an alkali metal, an ammonium or the equivalent of an alkaline earth metal;

$Y^1$, $Y^2$ and $Y^3$ are independently ethenyl or a grouping of the formula $—CH_2CH_2Z$, where Z is an alkali-eliminable grouping;

$R^1$, $R^2$, $R^3$, $R^4$, $R^5$ and $R^6$ are independently hydrogen, $(C_1–C_4)$-alkyl, $(C_1–C_4)$-alkoxy, sulfo or chloro;

W is hydrogen, chloro, bromo, nitro, amino, acetamido, benzamido, $(C_1–C_4)$-alkyl, $(C_1–C_4)$-alkoxy, hydroxy, ureido or $(C_2–C_4)$-alkanoyl;

V is hydrogen, chloro, bromo, nitro, amino, acetamido, benzamido, $(C_1–C_4)$-alkyl, $(C_1–C_4)$-alkoxy, hydroxy, ureido or $(C_2–C_4)$-alkanoyl;

L is hydrogen, methyl, ethyl or is ethyl which is substituted in the β-position by G;

G is cyano, hydroxy, sulfo, sulfato, phosphato, acetyloxy or a residue of a lower polyethylenepolyether.

Preference is given to dye mixtures including from 60 to 95% by weight of one or more dyestuffs of the general formula (1) and from 5 to 40% by weight of one or more of a dyestuff of the general formula (2), based on the weight of the dye mixture. Special preference is given to dye mixtures including from 65 to 90% by weight of one or more dyestuffs of the general formula (1) and from 10 to 35% by weight of one or more dyestuffs of the general formula (2), based on the weight of the dye mixture.

A $(C_1–C_4)$-alkyl grouping standing for $R^1$ to $R^6$, W or V may be straight-chain or branched and be for example methyl, ethyl, n-propyl, i-propyl, n-butyl, i-butyl, sec-butyl or tert-butyl. Preference is given to methyl and ethyl. The same logic rules for $(C_1–C_4)$-alkoxy groups, which are thus preferably methoxy and ethoxy. A $(C_2–C_5)$-alkanoyl grouping standing for W or V is preferably acetyl or propionyl. A residue of a lower polyethylenepolyether is preferably a residue of the formula $CH_3CH_2—(OCH_2CH_2)_n—O—$ with n=2–10.

Alkali metal M is preferably sodium, potassium or lithium, particularly preferably sodium. The equivalent of an alkaline earth metal M is preferably the equivalent of calcium.

An alkali-eliminable grouping Z is, for example, chloro, thiosulfato, phosphato, $(C_2–C_5)$-alkanoyloxy, such as acetyloxy, sulfobenzoyloxy or p-toluylsulfonyloxy and is preferably sulfato.

The groups "sulfo", "thiosulfato", "phosphato" and "sulfato" include both the acid form and the salt form of these groups. Accordingly, sulfo groups are groups of the formula $—SO_3M$, thiosulfato groups are groups of the formula $—S—SO_3M$, phosphato groups are groups of the formula $—OPO_3M_2$ and sulfato groups are groups of the formula $—OSO_3M$, in which M is defined as above. The groups $—SO_2Y^1$, $—SO_2Y^2$ and $—SO_2Y^3$ are preferably disposed para or meta relative to the diazo group, particularly preferably para. $Y^1$, $Y^2$ and $Y^3$ are preferably ethenyl or β-sulfatoethyl.

$R^1$ is preferably hydrogen, methoxy or sulfo, $R^2$ is preferably hydrogen, methyl or methoxy and $R^3$ and $R^4$ are preferably hydrogen. $R^5$ and $R^6$ are preferably hydrogen, methyl, methoxy or sulfo.

W is preferably hydrogen, chloro, nitro, amino, acetamido, methyl or ureido, V is preferably hydrogen or methoxy.

L is preferably hydrogen, ethyl, β-sulfatoethyl, β-hydroxyethyl or β-cyanoethyl, G is preferably sulfato, hydroxy or cyano.

In preferred dye mixtures according to the present invention, $R^1$ is hydrogen, methoxy or sulfo, $R^2$ to $R^6$ are hydrogen, $—SO_2Y^1$, $—SO_2Y^2$ and $—SO_2Y^3$ are disposed para relative to the diazo group, $Y^1$, $Y^2$ and $Y^3$ are β-sulfatoethyl and W, V, L and G have one of the preferred meanings given above.

The dye mixtures of the present invention may optionally contain one or more dyestuffs of the general formulae (3a) or (3b) or both

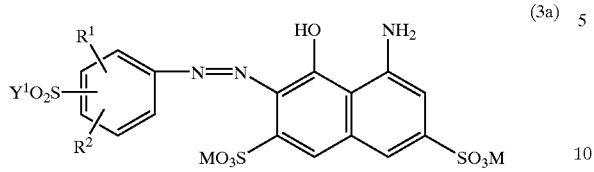

(3a)

(3b)

in which $R^1$, $R^2$, $R^3$, $R^4$, M, $Y^1$ and $Y^2$ are defined as above. These two dyestuffs may already be formed during the synthesis of the dyestuff of the general formula (1) if coupling reactions of the starting compounds are incomplete.

If the dye mixture of the present invention contains, as a further component, a dyestuff of formula (3a) or of formula (3b) or both, the dyestuff or dyestuffs of formula (3a) or of formula (3b) or of both are present in the dye mixture of the dyestuffs of the general formulae (1) and (2) in the range of 0.01 to 8% by weight, calculated on the 100% dye mixture of the dyestuffs of the general formulae (1) and (2).

The dye mixtures of the present invention may in addition contain further dyestuffs which act as so-called shading components. Such shading components are in particular red or yellow to golden orange dyestuffs. They may be contained in a ratio of up to 25% by weight of the total mixtures. Preferably, they are contained in amounts of 0.5 to 20% by weight, particularly preferably in amounts of 1 to 10% by weight, based on the weight of the dye mixture. These shading components are generally used to give the dyeings a more or less reddish or greenish shade and are also added to enhance the shade reproducibility of production batches. Preference is given to dyestuffs of the general formulae (4) to (10)

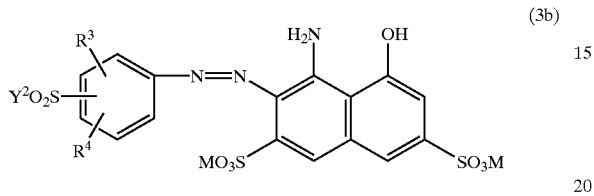

(4)

(5)

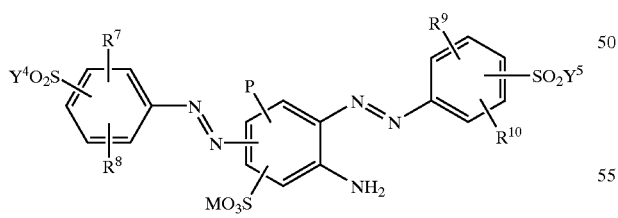

(6)

(7)

(8)

(9)

(10)

where

M is defined as given above;

$Y^4$ t $Y^{12}$ independently have one of the meanings of $Y^1$;

$R^7$ to $R^{18}$ and $R^{22}$ and $R^{23}$ independently have one of the meanings of $R^1$; $R^{19}$ to $R^{21}$ are independently $(C_1-C_4)$-alkyl, —COOH or —COOR$^{24}$, where $R^{24}$ is $(C_1-C_4)$-alkyl; and P to $P^2$ are independently hydroxy, $(C_1-C_4)$-alkoxy, amino, $(C_1-C_4)$-alkylamino or di-$(C_1-C_4)$-alkylamino.

Especially preferred shading components are the dyestuffs of the formulae (4a), (5a), (6a), (7a), (7b) and (8a)

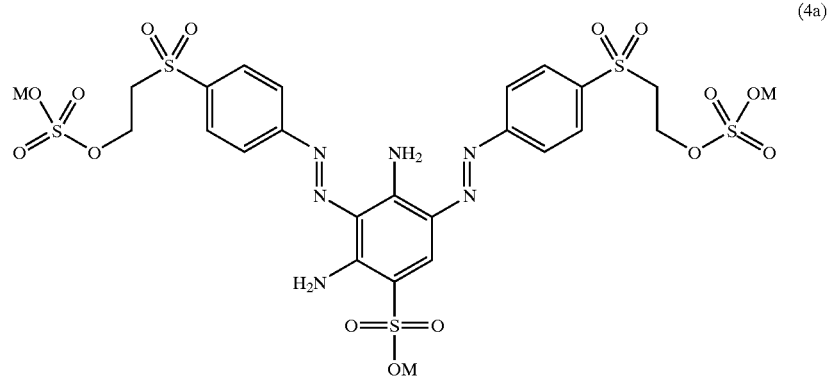
(4a)
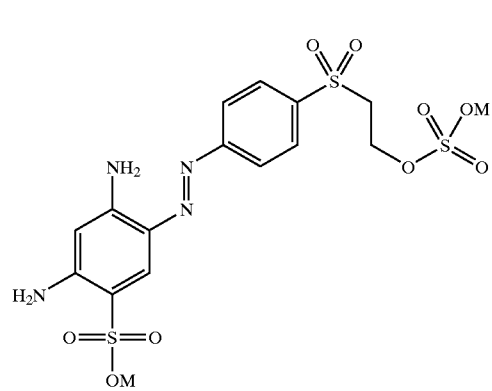
(5a)
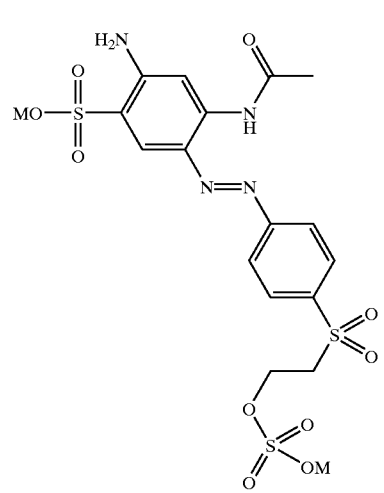
(6a)
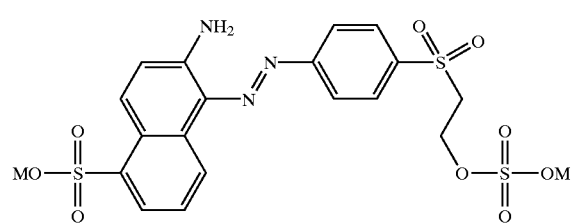
(7a)
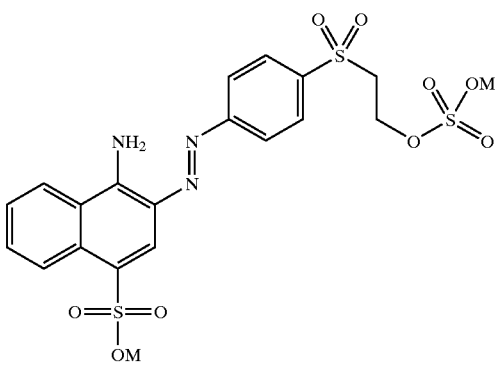
(7b)
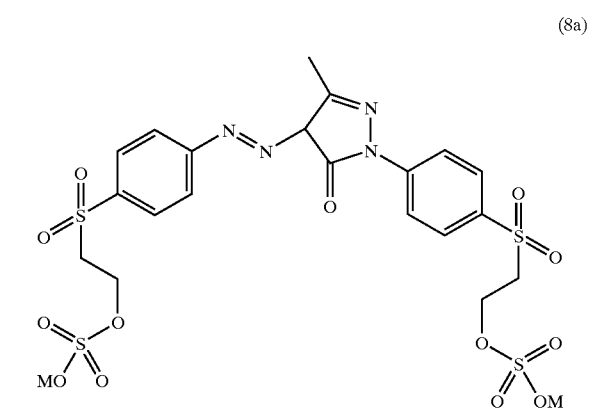
(8a)
wherein M is defined as given above.

The dyestuffs of the general formulae (4) to (10) are known. The dyestuffs of the general formula (4) are described in DEA 4329421, the dyestuffs of the general formula (5) in JP-A 69-14107, the dyestuffs of the general formula (6) in DE-A 3134357, the dyestuffs of the general formula (7b) in DE-A 1911427, the dyestuffs of the general formula (8) in EP-A 489360, the dyestuffs of the general formula (9) in DE-A 1911427 and the dyestuffs of the general formula (10) in DEA 1215282.

The dyestuffs of the general formulae (1) to (10), in particular if those corresponding to the same general formula have the same chromophore, can have, within the meaning of their Y-moiety, structurally different fiber-reactive groups corresponding to their —$SO_2$—Y-moiety. In particular, the dye mixture can contain dyestuffs of the same chromophore conforming to the general formula (1) and/or dyestuffs of the same chromophore conforming to general formula (2), optionally likewise of the general formulae (3a), (3b) and (4) to (10) in which the fiber-reactive groups of the corresponding —$SO_2$—Y-moiety are partly vinylsulfonyl groups and partly groups in which the Y-moiety is a β-ethyl substituted group as defined above, such as β-chloroethylsufonyl, β-thiosulfatoethylsulfonyl or, preferably, β-sulfatoethylsulfonyl groups. If the dye mixtures contain the respective dyestuff components in the form of a vinylsulfonyl dye, the proportion of the respective vinylsulfonyl dyestuff to the respective dyestuff with a Y-moiety being a β-ethyl substituted group as defined above; such as a β-chloro- or β-thiosulfato- or β-sulfatoethyl-sulfonyl dye, will be up to about 30 mol-%, based on the respective dyestuff chromophore. Preference is here given to the dye mixtures in which the proportion of vinylsulfonyl dyestuff to said β-substituted-ethylsulfonyl dyestuff, such as β-sulfatoethylsulfonyl dyestuff, is in terms of the molar ratio between 2:98 and 30:70.

The dye mixtures of the present invention can be present as a preparation in solid or liquid (dissolved) form. In solid form they generally contain the electrolyte salts customary in the case of water-soluble and in particular fiber-reactive dyes, s such as sodium chloride, potassium chloride and sodium sulfate, and also the assistants customary-in commercial dyes, such as buffer substances capable of establishing a pH in aqueous solution between 3 and 7, such as sodium acetate, sodium borate, sodium bicarbonate, sodium citrate, sodium dihydrogenphosphate and disodium hydrogenphosphate, small amounts of siccatives or, if they are present in liquid, aqueous solution (including the presence of thickeners of the type customary in print pastes), substances which ensure the permanence of these preparations, for example mold preventatives.

In general, the dye mixtures of the present invention are present as dye powders containing 10 to 80% by weight, based on the dye powder or preparation, of a strength-standardizing colorless diluent electrolyte salt, such as those mentioned above. These dye powders may additionally include the aforementioned buffer substances in a total amount of up to 10%, based on the dye powder. If the dye mixtures of the present invention are present in aqueous solution, the total dye content of these aqueous solutions is up to about 50% by weight, for example between 5 and 50% by weight, and the electrolyte salt content of these aqueous solutions will preferably be below 10% by weight, based on the aqueous solutions. The aqueous solutions (liquid preparations) may include the aforementioned buffer substances in an amount which is generally up to 10% by weight, for example 0.1 to 10% by weight, preference being given to up to 4% by weight, especially 2 to 4% by weight.

The present invention also relates to the preparation of dye mixtures according to the present invention. This may be effected in a conventional manner, by mechanically mixing the solid or liquid individual dyestuffs of the general formulae 1 and 2 and optionally of the general formulae (3a), (3b) and/or (4) to (10) in the desired blend ratio;. The requisite individual dyes of the general-. formulae (1) to (10) are known and can be prepared according to processes known per se, or else acquired commercially.

A dyestuff of the general formula (1) may for example be prepared by a) preparing an aqueous solution of a mixture of 1-amino-8-hydroxynaphthalene-3,6,-disulfonic acid and a diazo compound prepared by diazotization of a compound of the general formula (11)

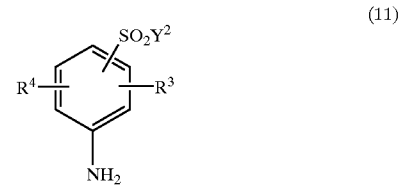

(11)

where $R^3$, $R^4$ and $Y^2$ are each as defined above, and carrying out a coupling reaction, preferably at a pH below 1.5, to form a compound of the formula (3b), and b) reacting the compound of the formula (3b) obtained in a second coupling reaction, preferably at a pH between 3 and 6.5, with a diazo compound prepared by diazotization of a compound of the general formula (12)

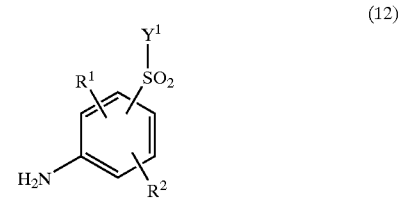

(12)

where $R^1$, $R^2$ and $Y^1$ are each as defined above

A dyestuff of the general formula (2) may be prepared likewise by a) diazotation of a compound of the general formula (13)

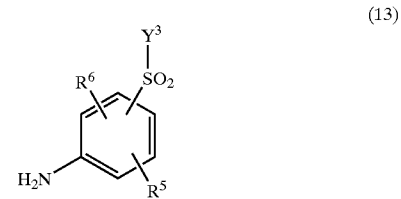

(13)

where $R^5$, $R^6$ and $Y^3$ are each as defined above, and b) coupling the diazo compound obtained from the compound of the general formula (13) with a solution or a suspension of a compound of the general formula (14)

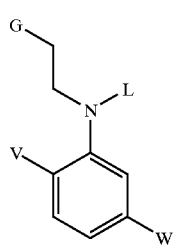

(14)

where G, L, V and W are each as defined above.

The coupling reaction to form a dyestuff of the general formula (2) is preferably carried out at a pH between 3 and 7.

The dye mixtures of the present invention may then be produced by mixing the solutions of the dyestuffs of the formulae (1) and (2) obtained, optionally together with the dyestuffs of the general formulae (3a), (3b) and (4) to (10) in the appropriate proportions and isolation by the addition of salt or evaporation of water in, for example, a spray dryer. Alternatively, the individual dyes of the general formulae (1) and (2) can be isolated as powders or press cakes and then mixed, optionally together with the dyestuffs of the general formulae (3a), (3b) and (4) to (10). As mentioned above, the dyestuffs of the general formulae (3a) and (3b) may already be formed during synthesis of the dyestuff of the general formula (1).

Preferred compounds of the general formulae (11), (12) and (13) are 1-sulfo-4-(2-sulfatoethylsulfonyl)-aniline, 1-sulfo-5-(2-sulfatoethylsulfonyl)-aniline, 3-(2-sulfatoethylsulfonyl)-aniline, 2-methoxy-5-(2-sulfatoethylsulfonyl)-aniline, 2,5-dimethoxy-4-(2-sulfatoethylsulfonyl)-aniline, 2-methoxy-5-methyl-4-(2-sulfatoethylsulfonyl)-aniline, 4-(ethenosulfonyl)-aniline and 4-(2-sulfatoethylsulfonyl)-aniline.

Preferred compounds of the general formula (14) are N,N-bis-(2-hydroxyethyl)-aniline, N,N-bis-(2-hydroxyethyl)-3-toluidine, N,N-bis-(2-hydroxyethyl)-3-N-acetaniline, N,N-bis-(2-hydroxyethyl)-3-aminoaniline, N,N-bis-(2-sulfatoethyl)-aniline, N,N-bis-(2-sulfatoethyl)-toluidine; N,N-bis-(2-sulfatoethyl)-3-chloroaniline, N,N-bis-(2-sulfatoethyl)-acetaniline, N,N-bis-(2-sulfatoethyl)-3-aminoaniline, N-(2-hydroxyethyl)-N-ethyl-aniline, N-(2-hydroxyethyl)-N-ethyl-3-toluidine, N-hydroxyethyl-N-ethyl-3-acetaniline, N-hydroxyethyl-N-ethyl-3-aminoaniline, N-(2-sulfatoethyl)-N-ethyl-aniline, N-(2-sulfatoethyl)-N-ethyl-toluidine, N-(2-sulfatoethyl)-N-ethyl-3-chloroaniline, N-(2-sulfatoethyl)-N-ethyl-aniline, N-(2-sulfatoethyl)-N-ethyl-3-acetamidoaniline, N-(2-sulfatoethyl)-N-ethyl-3-methoxyaniline, N-(2-sulfatoethyl)-N-ethyl-3,5-dimethoxyaniline, N-(2-sulfatoethyl)-N-(2-cyanoethyl)-aniline, N-(2-sulfatoethyl)-N-(2-cyanoethyl)-toluidine, N-(2-sulfatoethyl)-N-(2-cyanoethyl)-3-acetamidoaniline, N-(2-sulfatoethyl)-N-(2-cyanoethyl)-3-chloroaniline, N-(2-sulfatoethyl)-N-(2-cyanoethyl)-5-methoxy-3-acetamidoaniline, N,N-bis-(2-sulfoethyl)-aniline, N,N-bis-(2-sulfoethyl)-3-toluidine, N,N-bis-(2-sulfo-ethyl)-3-acetaniline, N,N-bis-(2-hydroxyethyl)-5-methoxy-3-toluidine, N,N-bis-(2-hydroxyethyl)-5-methoxy-3-acetaniline, N,N-bis-(2-hydroxyethyl)-5-methoxy-3-aminoaniline, N,N-bis-(2-sulfatoethyl)-toluidine, N,N-bis-(2-sulfatoethyl)-5-methoxy-3-chloroaniline, N,N-bis-(2-sulfatoethyl)-5-methoxy-3-acetaniline and N,N-bis-(2-sulfatoethyl)-3-aminoaniline.

Dye mixtures according to the present invention, containing only dyestuffs of the general formulae (1) and (2), whose precursors of the general formulae (11), (12) and (13) are identical ((11)=(12)=(13)) may also be obtained by direct synthesis. This may be effected in a conventional manner by reacting the diazonium salt of the compound of the general formula (11) with a mixture of 1-amino-8-naphthol-3,6-disulfonic acid and a compound of the general formula (14) in the desired blend ratio.

Dye mixtures of the present invention containing the dyestuffs of the general formulae (1) and (2) and optionally (3a), (3b) and (4) to (10), partly or completely in form of the vinylsulfonyl dyestuff (i.e. the Y-moiety is ethenyl) cannot only be prepared by the above mentioned methods using appropriate vinylsulfonyl starting compounds, but also by reacting dye mixtures of the present invention containing dyestuffs wherein the Y-moieties are —CH$_2$CH$_2$Z with Z being chloro, thiosulfato-or sulfato, with alkali in an amount necessary to transfer said Y-moieties into ethenyl-groups to the required extent. Said transfer is carried out by generally known methods of transferring β-substituted ethylsulfonyl groups into the vinylsulfonyl group.

The dye mixtures of the invention have useful application properties. They are used for dyeing or printing hydroxyl-and/or carboxamido-containing materials, for example in the form of sheet like structures, such as paper and leather or of films, for example composed of polyamide, or in bulk, as for example of polyamide and polyurethane, but especially for dyeing or printing these materials in fiber form.

The present invention thus also relates to the use of the dye mixtures of the invention for dyeing or printing these materials, or rather to processes for dyeing or printing these materials in a conventional manner, by using a dye mixture of the invention as colorant. The materials are preferably employed in the form of fiber materials, especially in the form of textile fibers, such as woven fabrics or yarns, as in the form of hanks or wound packages.

Hydroxyl-containing materials are those of natural or synthetic origin, for example cellulose fiber materials or their regenerated products and polyvinyl alcohols. Cellulose fiber materials are preferably cotton, but also other vegetable fibers, such as linen, hemp, jute and ramie fibers; regenerated cellulose fibers are for example staple viscose and filament viscose.

Carboxamido-containing materials are for example synthetic and natural polyamides and polyurethanes, especially in the form of fibers, for example wool and other animal hairs, silk, leather, nylon-6,6, nylon-6, nylon-11 and nylon-4.

The dye mixtures of the invention can be applied to and fixed on the substrates mentioned, especially the fiber materials mentioned, by the application techniques known for water-soluble dyes, especially fiber-reactive dyes. For instance, on cellulose fibers they produce dyeings of deep black shades which are readily dischargeable. They have good color build-up properties and good wash-off properties in respect to unfixed dye portions.

Application is preferably from an aqueous bath at temperatures between 40 and 105° C., optionally at a temperature of up to 130° C. under superatmospheric pressure, and optionally in the presence of customary dyeing auxiliaries. One possible procedure is to introduce the material into the warm bath and to gradually heat the bath to the desired dyeing temperature and to complete the dyeing process at that temperature. The neutral salts which accelerate the exhaustion of the dyes may also, if desired, only be added to the bath after the actual dyeing temperature has been reached.

Similarly, the customary printing processes for cellulose fibers, which can be carried out either single-phase, for example by printing with a print paste comprising sodium bicarbonate or some other acid-binding agent and by subsequent steaming at 100 to 103° C., or two-phase, for example by printing with a neutral or weakly acidic print colour and subsequent fixation either by passing the printed material through a hot electrolyte-comprising alkaline bath or by overpadding with an alkaline electrolyte-comprising padding liquor with subsequent batching of the alkali-overpadded material or subsequent steaming or subsequent treatment with dry heat, produce strong prints with well-defined contours and a clear white ground. The appearance of the prints is not greatly affected by variations in the fixing conditions.

When fixing by means of dry heat in accordance with the customary thermofix processes, hot air from 120 to 200° C. is used. In addition to the customary steam at 101 to 103° C. it is also possible to use superheated steam and high-pressure steam at temperatures of up to 160° C.

The acid-binding agents which effect the fixation of the dyes of the dye mixtures of the invention on-the cellulose fibers include for example water-soluble basic salts of the alkali metals and likewise alkaline earth metals of inorganic or organic acids or compounds which liberate alkali in the heat. Especially suitable are the alkali metal hydroxides and alkali metal salts of weak to medium inorganic or organic acids, the preferred alkali metal compounds being the sodium and potassium compounds. Such acid-binding agents include for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, waterglass or trisodium phosphate.

sulfonic acid or on the basis of a reaction product of for example stearylamine with ethylene oxide. For instance, the dye mixture of the invention is preferably subjected to the exhaust process initially from an acidic dyebath having a pH of about 3.5 to 5.5 under pH control and the pH is then, toward the end of the dyeing time, shifted into the neutral and optionally weakly alkaline range up to a pH of 8.5 to bring about, especially for very deep dyeings, the full reactive bond between the dyes of the dye mixtures of the invention and the fiber. At the same time, the dye portion not reactively bound is removed.

The procedure described herein also applies to the production of dyeings on fiber materials composed of other natural polyamides or of synthetic polyamides and polyurethanes. In general, the material to be dyed is introduced into the bath at a temperature of about 40° C., agitated therein for some time, the dyebath is then adjusted to the desiredweakly acidic, preferably weakly acetic acid, pH and the actual dyeing is carried out at a temperature between 60 and 98° C. However, the dyeings can also be carried out at the boil or at temperatures of up to 120° C. (under superatmospheric pressure).

The examples which follow illustrate the invention. Parts and percentages are by weight, unless otherwise stated. The parts by weight bear the same relation to parts by volume as the kilogram to the liter.

EXAMPLE 1

200 parts of an electrolyte-containing dye powder which contains the navy-dyeing disazo dyestuff of the formula (1a)

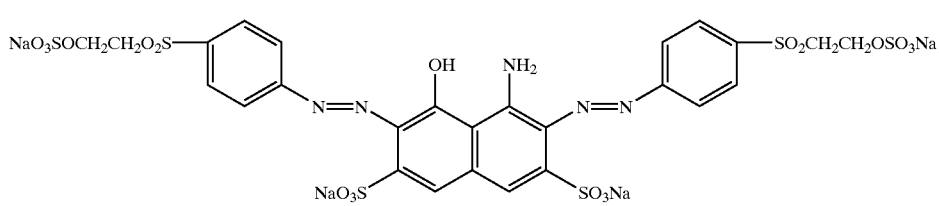

The dye mixtures of the invention are notable for a high yield of fixation when applied to the cellulose fiber materials by dyeing or printing. The cellulose dyeings obtained following the customary after treatment by rinsing to remove unfixed dye portions exhibit excellent wet fastnesses, in particular since such unfixed dye portions are easily washed off on account of their good solubility in cold water.

Furthermore, the dye mixtures of the invention can also be used for the fiber-reactive dyeing of wool. Moreover, wool which has been given a nonfelting or low-felting finish (cf. for example H. Rath, Lehrbuch der Textilchemie, Springer-Verlag, 3rd Edition (1972), p. 295–299, especially the finish by the Hercosett process (p. 298); J. Soc. Dyers and Colourists 1972, 93–99, and 1975, 33–44) can be dyed with very good fastness properties.

The process of dyeing on wool is here carried out in a conventional manner from an acidic medium. For instance, acetic acid and/or ammonium sulfate or acetic acid and ammonium acetate or sodium acetate may be added to the dyebath to obtain the desired pH. To obtain a dyeing of acceptable levelness, it is advisable to add a customary leveling agent, for example on the basis of a reaction product of cyanuric chloride with 3 times the molar amount of an aminobenzenesulfonic acid and/or of an aminonaphthalenein a proportion of 70% are mechanically mixed with 60 parts of an electrolyte-containing dye powder which contains the orange-dyeing monoazo dyestuff of the formula (2a)

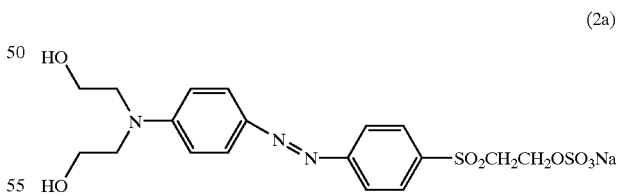

in a proportion of 70%.

The resulting dye mixture according to the invention, when employed according to the application and fixing methods customary in the art for fiber-reactive dyes, produces for example on cellulose fiber materials dyeings and prints in deep black shades.

EXAMPLE 2

A dye mixture according to the invention is prepared by diazotizing 281 parts of 4-(β-sulfatoethylsulfonyl)aniline in 1500 parts of ice-water and 180 parts of 30% aqueous hydrochloric acid with 173 parts of 40% strength aqueous sodium nitrite solution. 120 parts of 1-amino-8-napthol-3, 6-disulfonic acid is added and coupling is carried out at a pH between 1 and 1.3 and at a temperature below 20° C. (the pH is maintained with about 50 parts of sodium bicarbonate). 88 parts N-(β-cyanoethyl)-N-(2-sulfatoethyl)-3-toluidine is added to the above coupling mixture and the pH is raised to 6 with sodium carbonate at a temperature below 30° C. The resulting solution contains the dyestuffs of the formulae (1a) and (2b)

(2b)

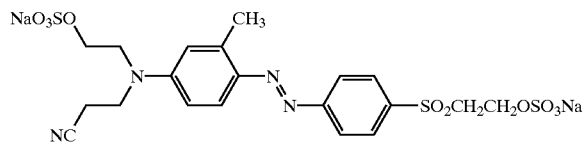

To this solution containing the dyestuffs of the formulae (1a) and (2b) 50 parts of a yellow dye of the formula (9a)

(9a)

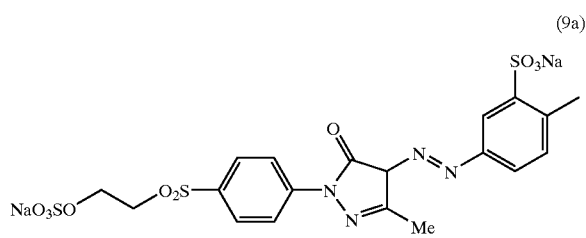

are added, which was prepared according to DE-C 1215282. The result obtained is dye mixture in which the dyestuffs of the formulae (1a), (2b) and (9a) are present in the ratio of about 70%:24%:7%.

This dye solution is adjusted to pH 4.5 by adding 5 parts of a sodium phosphate buffer. By further diluting with water or by evaporating the solution, this liquid dye mixture can then be standardized to the desired strength for a liquid preparation. The dye mixture affords deep black shades on cellulosic materials.

EXAMPLE 3

281 parts of 4-(β-sulfatoethylsulfonyl)aniline in 1500 parts of ice-water and 180 parts of 30% aqueous hydrochloric acid was diazotized by dropwise addition of 173 parts of 40% aqueous sodium nitrite solution. After stirring for 4 hours at 0–5° C. excess nitrite was removed by addition of sulfamic acid. The resulting solution was pumped to a neutral solution of 245 parts N-ethyl-N-(2-sulfatoethyl)-aniline in 1500 parts water and the pH was maintained at 4 to 6 with sodium carbonate at a temperature below 30° C. The resulting solution was spray dried yielding approx. 700 parts of the dyestuff (2c):

(2c)

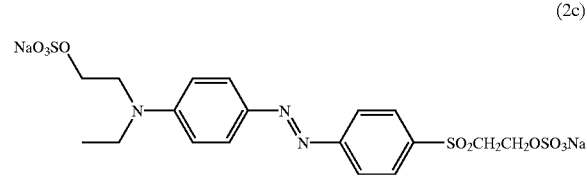

22,5 parts of the dyestuff thus obtained where mixed with 77.5 parts of dyestuff (1a), which was prepared according to the literature, in a mechanical blender. The resulting mixture dyes cotton in deep black shades.

EXAMPLES 4 to 177

The following orange components where prepared as described in Example 3:

(2d)

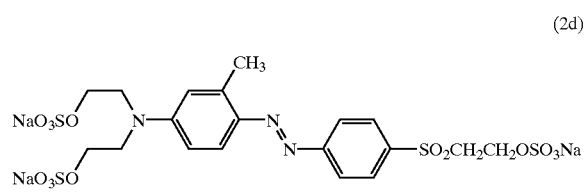

(2e)

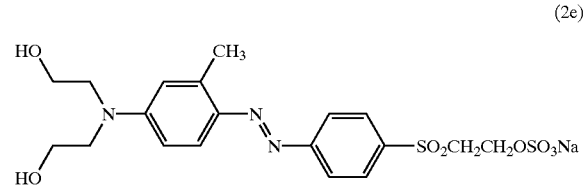

(2f)

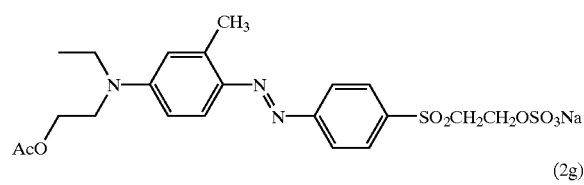

(2g)

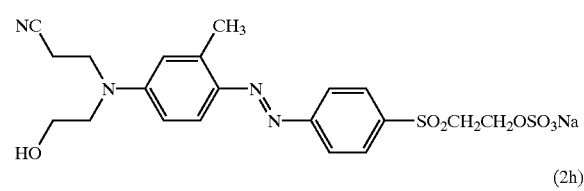

(2h)

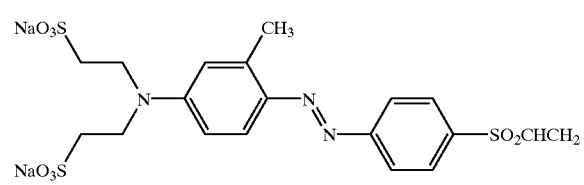

(2i)

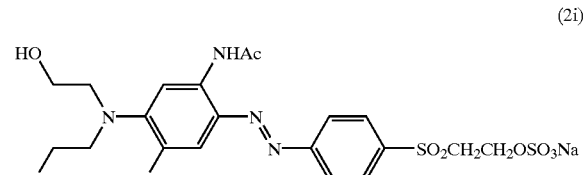

(2j)

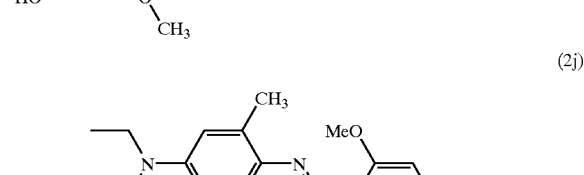

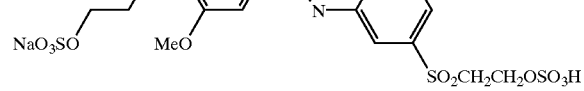

-continued
(2k)
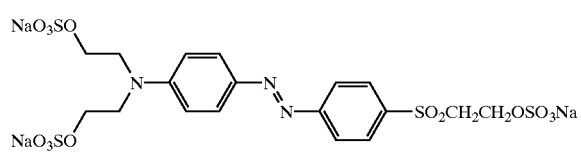
(2l)
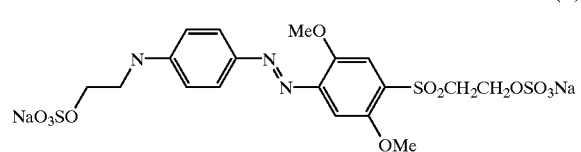
(2m)
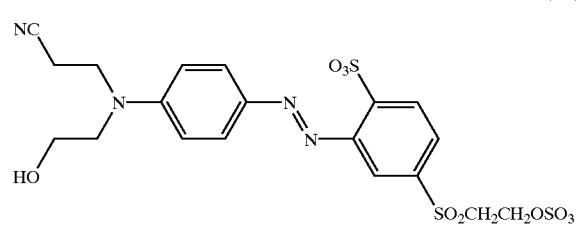
(2n)
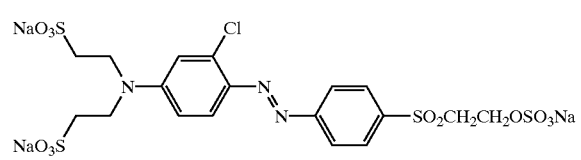
(2o)
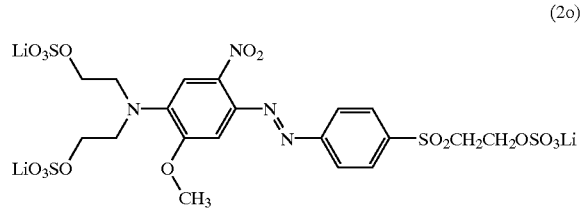
(2p)
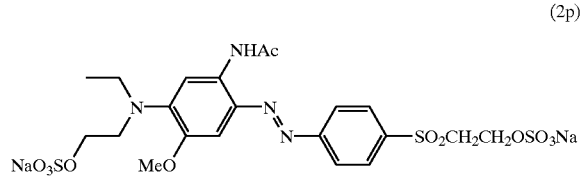
(2q)
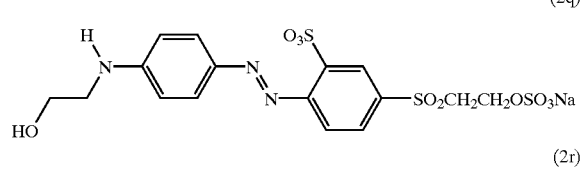
(2r)
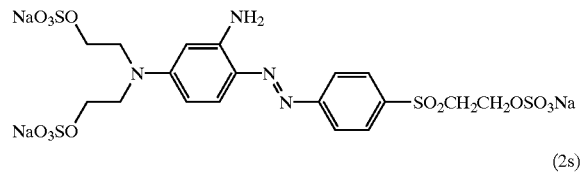
(2s)
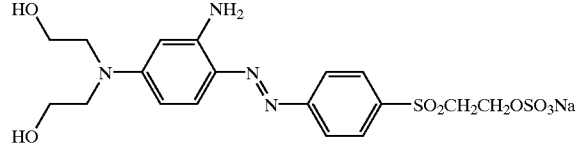
-continued
(2t)
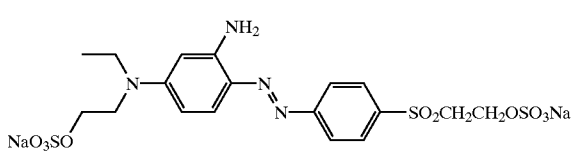
(2u)
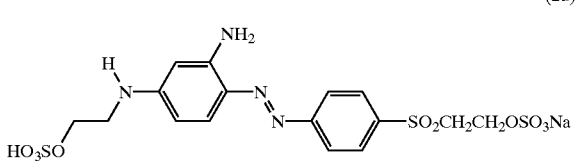
(2v)
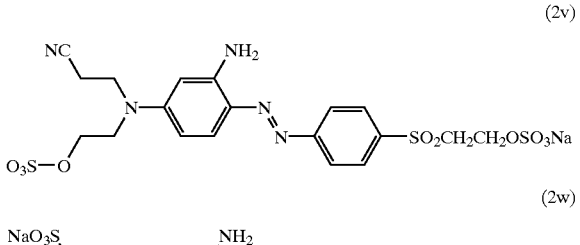
(2w)
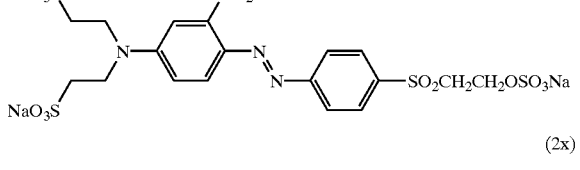
(2x)
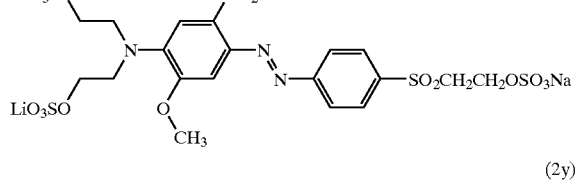
(2y)
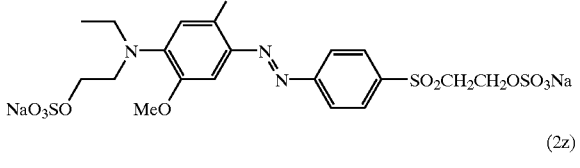
(2z)
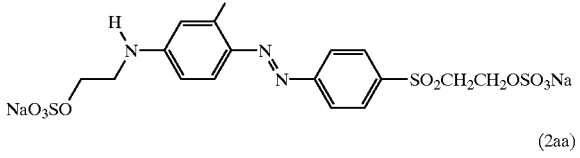
(2aa)
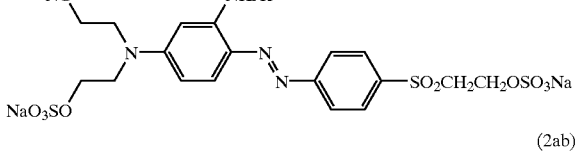
(2ab)
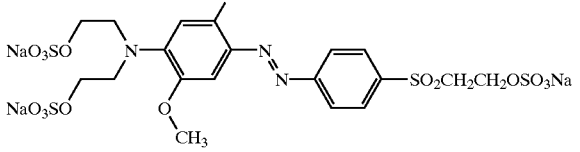

The dyestuffs (2d) to (2aq) were mixed with dyestuffs of the general formula (1) and optionally with an additional dyestuff of the formulae (3a), (3b) and (4) to (10) as specified in the following table. When employed according to the application and fixing methods customary in the art for fiber-reactive dyes, these dye mixtures produce, for example, on cellulose fiber materials, deep black dyeings.
| Example | Dyestuff of the formula (1) |
|---|---|
| 4 | 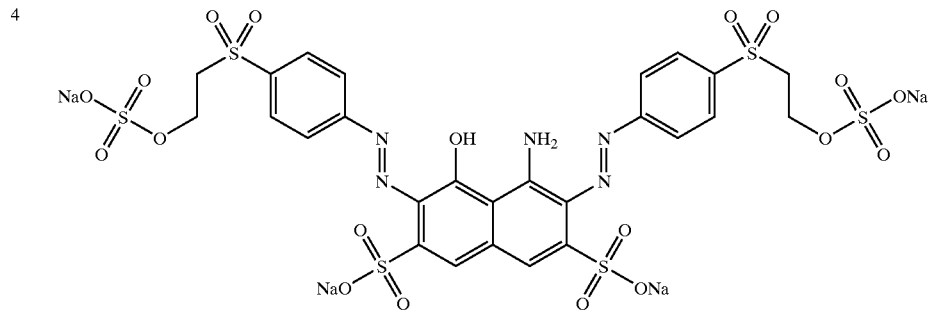 |
| 5 | " |
| 6 | " |
| 7 | " |
| 8 | " |
| 9 | " |
| 10 | " |
| 11 | " |
| 12 | " |
| 13 | " |
| 14 | " |
| 15 | " |
| 16 | " |
| 17 | " |
| 18 | " |
| 19 | " |
| 20 | " |
| 21 | 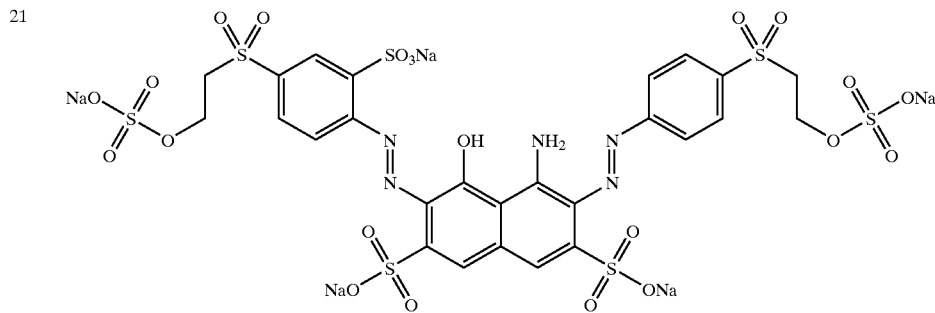 |
| 22 | " |
| 23 | " |
| 24 | " |
| 25 | " |
| 26 | " |
| 27 | " |
| 28 | " |
| 29 | " |
| 30 | " |
| 31 | " |
| 32 | " |
| 33 | " |
| 34 | " |
| 35 | " |
| 36 | " |
| 37 | " |
| 38 | " |
| 39 | " |
| 40 | " |

| | |
|---|---|
| 41 | 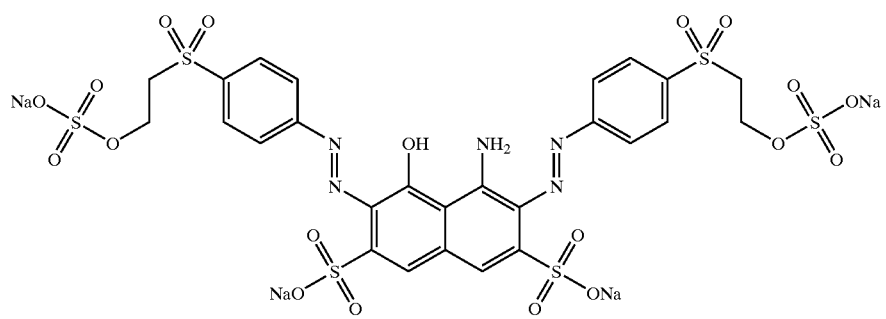 |
| 42 | " |
| 43 | " |
| 44 | " |
| 45 | " |
| 46 | " |
| 47 | " |
| 48 | " |
| 49 | " |
| 50 | " |
| 51 | " |
| 52 | " |
| 53 | " |
| 54 | " |
| 55 | " |
| 56 | " |
| 57 | " |
| 58 | " |
| 59 | " |
| 60 | " |
| 61 | 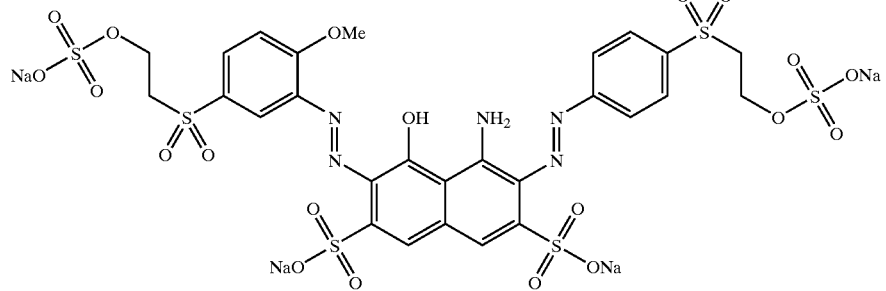 |
| 62 | " |
| 63 | " |
| 64 | " |
| 65 | " |
| 66 | " |
| 67 | " |
| 68 | " |
| 69 | " |
| 70 | " |
| 71 | " |
| 72 | " |
| 73 | " |
| 74 | " |
| 75 | " |
| 76 | " |
| 77 | " |
| 78 | " |
| 79 | " |
| 80 | " |

-continued
| | |
|---|---|
| 81 | 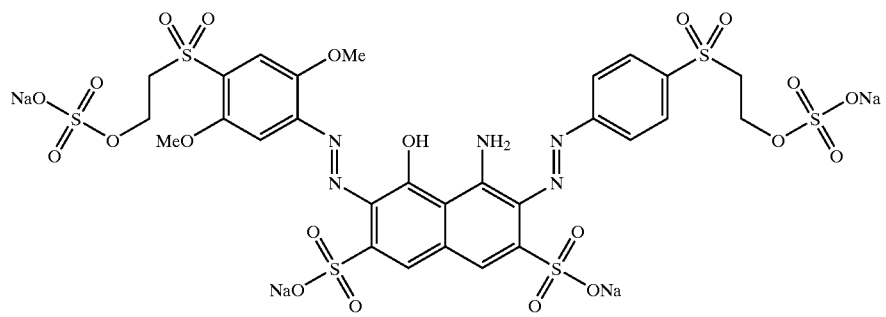 |
| 82 | " |
| 83 | " |
| 84 | " |
| 85 | " |
| 86 | " |
| 87 | " |
| 88 | " |
| 89 | " |
| 90 | " |
| 91 | " |
| 92 | " |
| 93 | " |
| 94 | 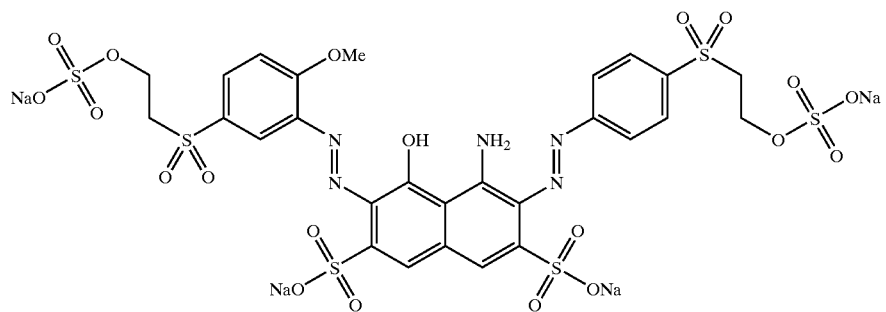 |
| 95 | " |
| 96 | " |
| 97 | " |
| 98 | " |
| 99 | " |
| 100 | 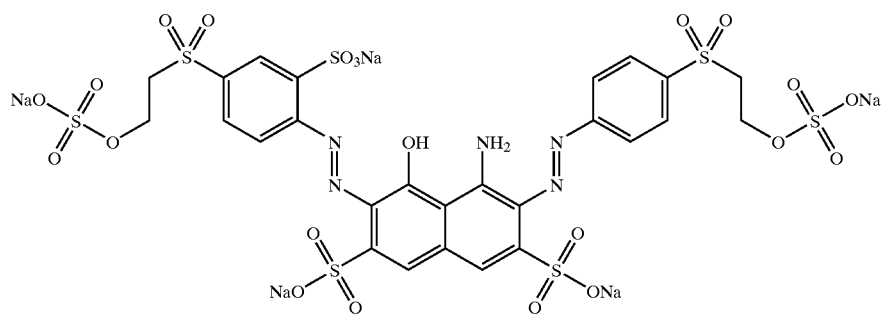 |
| 101 | " |
| 102 | " |
| 103 | " |
| 104 | " |
| 105 | " |
| 106 | " |

| 107 | 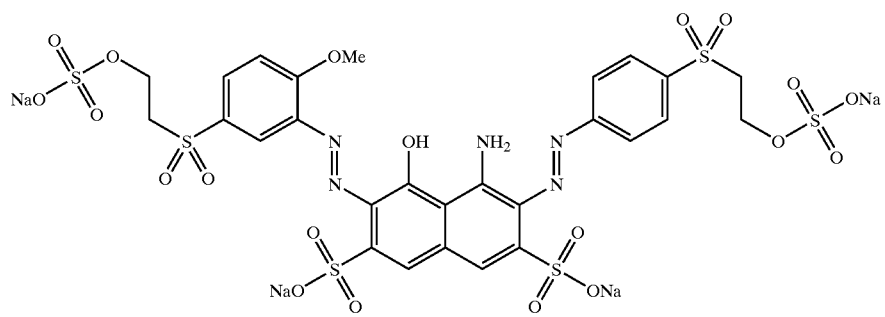 |
| --- | --- |
| 108 | " |
| 109 | " |
Dye of the formula (1)
| 110 | 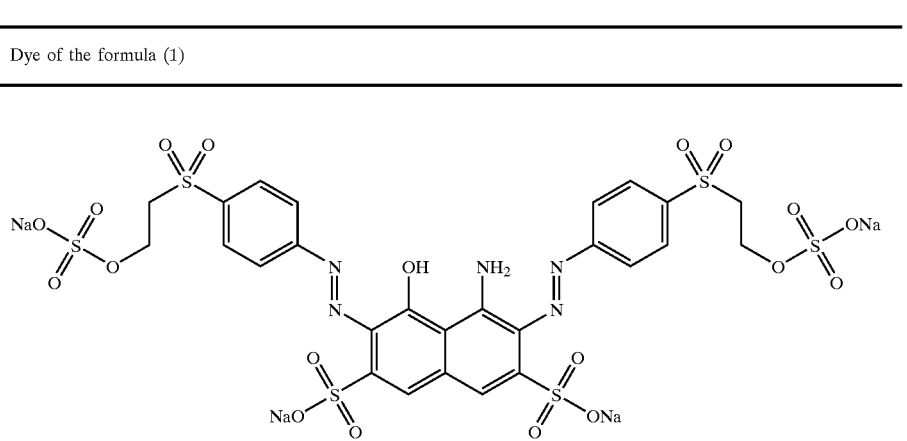 |
| --- | --- |
| 111 | " |
| 112 | " |
| 113 | " |
| 114 | " |
| 115 | " |
| 116 | " |
| 117 | " |
| 118 | " |
| 119 | " |
| 120 | " |
| 121 | 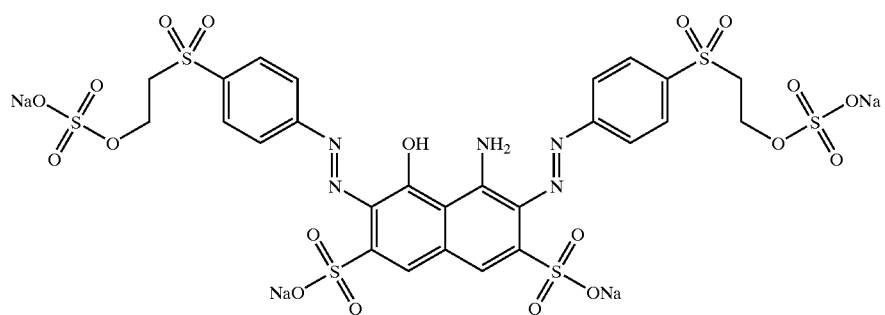 |
| 122 | " |
| 123 | " |
| 124 | " |

| 125 | 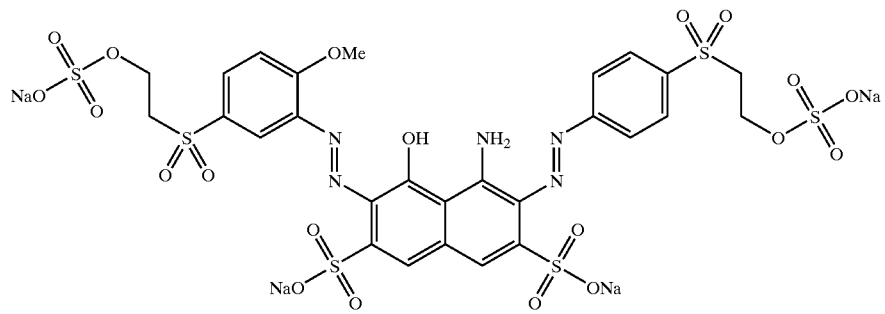 |
| 129 | " |
| 130 | " |
| 131 | 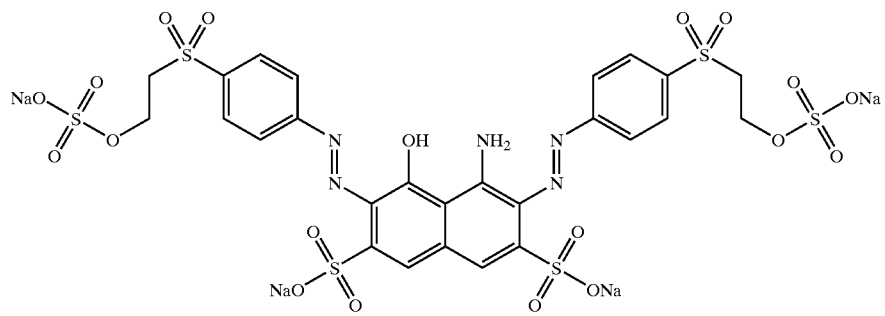 |
| 132 | " |
| 133 | " |
| 134 | " |
| 135 | " |
| 136 | " |
| 137 | " |
| 138 | 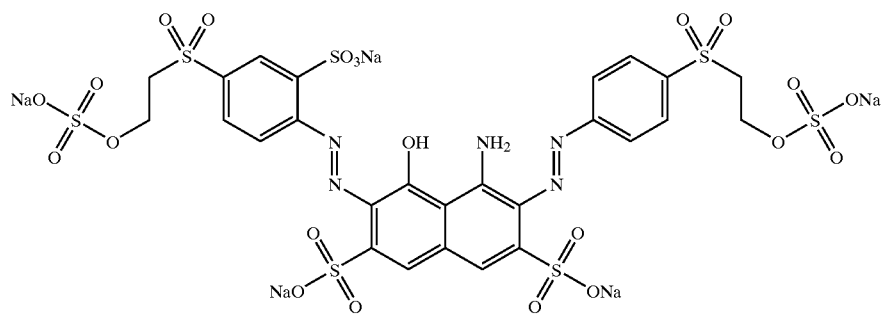 |
| 139 | " |
| 140 | " |
| 141 | " |
| 142 | " |
| 143 | " |
| 144 | " |
| 145 | " |
| 146 | " |
| 147 | " |

148 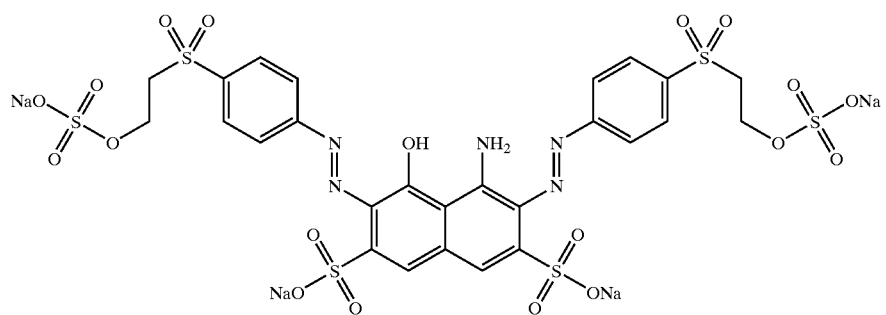
149 "
150 "
151 "
152 "
153 "
154 "
155 "
156 "
157 "
158 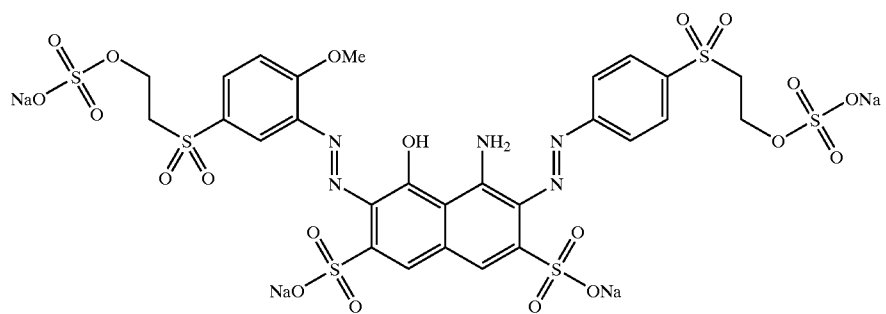
159 "
160 "
161 "
162 "
163 "
164 "
165 "
166 "
167 "
168 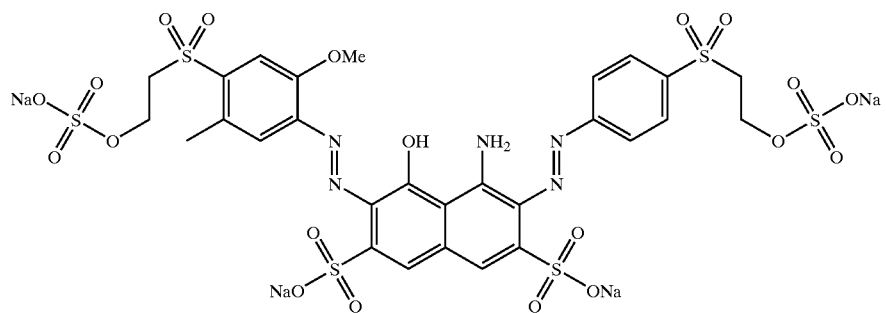
169 "
170 "
171 "
172 "
173 "
174 "
175 "
176 "
177 "

-continued

| Example | Dyestuff of the Ratio formula (2) |
|---|---|
| 4 | 2a |
| 5 | 2d |
| 6 | " |
| 7 | 2e |
| 8 | " |
| 9 | " |
| 10 | 2j |
| 11 | " |
| 12 | " |
| 13 | 2i |
| 14 | " |
| 15 | " |
| 16 | 2h |
| 17 | " |
| 18 | " |
| 19 | 2f |
| 20 | 2g |
| 21 | 2a |
| 22 | " |
| 23 | " |
| 24 | 2d |
| 25 | " |
| 26 | " |
| 27 | 2e |
| 28 | " |
| 29 | " |
| 30 | 2j |
| 31 | " |
| 32 | " |
| 33 | 2i |
| 34 | " |
| 35 | " |
| 36 | 2h |
| 37 | " |
| 38 | " |
| 39 | 2f |
| 40 | 2g |
| 41 | 2k |
| 42 | 2l |
| 43 | 2m |
| 44 | 2n |
| 45 | 2o |
| 46 | 2p |
| 47 | 2q |
| 48 | 2r |
| 49 | 2s |
| 50 | 2t |
| 51 | 2u |
| 52 | 2v |
| 53 | 2w |
| 54 | 2x |
| 55 | 2y |
| 56 | 2z |
| 57 | 2aa |
| 58 | 2ab |
| 59 | 2ac |
| 60 | 2ad |
| 61 | 2k |
| 62 | 2l |
| 63 | 2m |
| 64 | 2n |
| 65 | 2o |
| 66 | 2p |
| 67 | 2q |
| 68 | 2r |
| 69 | 2s |
| 70 | 2t |
| 71 | 2u |
| 72 | 2v |
| 73 | 2w |
| 74 | 2x |
| 75 | 2y |
| 76 | 2z |
| 77 | 2aa |
| 78 | 2ab |
| 79 | 2ac |
| 80 | 2ad |

-continued
| | |
|---|---|
| 81 | 2ae |
| 82 | 2af |
| 83 | 2ag |
| 84 | 2ah |
| 85 | 2ai |
| 86 | 2aj |
| 87 | 2ak |
| 88 | 2al |
| 89 | 2am |
| 90 | 2an |
| 91 | 2ao |
| 92 | 2ap |
| 93 | 2aq |
| 94 | 2ae |
| 95 | 2af |
| 96 | 2ag |
| 97 | 2ah |
| 98 | 2ai |
| 99 | 2aj |
| 100 | 2ak |
| 101 | 2al |
| 102 | 2am |
| 103 | 2an |
| 104 | 2ao |
| 105 | 2ap |
| 106 | 2aq |
| 107 | 2aj |
| 108 | 2af |
| 109 | 2i |
| Example | Dye of the formula (2) |
|---|---|
| 110 | 2d |
| 111 | 2i |
| 112 | 2k |
| 113 | 2ad |
| 114 | " |
| 115 | 2t |
| 116 | 2r |
| 117 | 2d |
| 118 | " |
| 119 | 2p |
| 120 | 2ab |
| 121 | 2i |
| 122 | 2t |
| 123 | 2y |
| 124 | 2ac |
| 125 | 2af |
| 129 | 2ap |
| 130 | 2ao |
| 131 | 2al |
| 132 | 2an |
| 133 | 2aj |
| 134 | 2ac |
| 135 | 2af |
| 136 | 2ak |
| 137 | 2e |
| 138 | 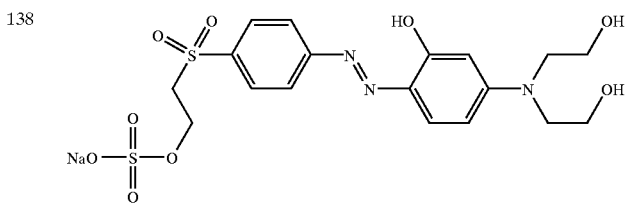 |
| 139 | 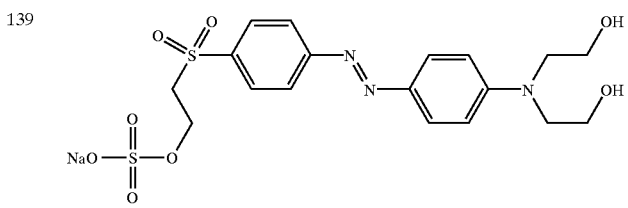 |

-continued
| 140 | 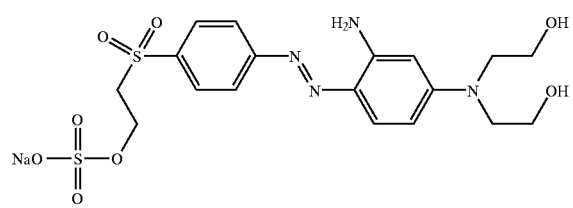 |
|---|---|
| 141 | 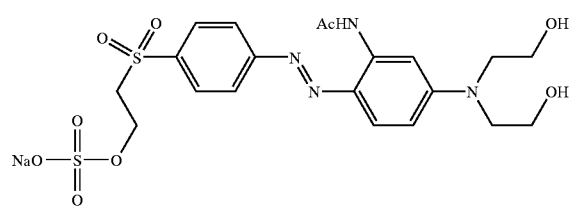 |
| 142 | 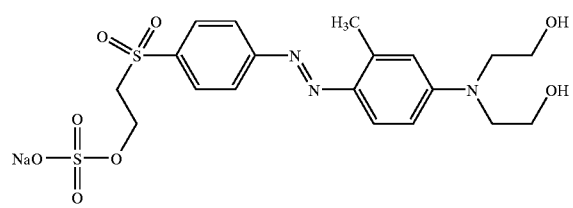 |
| 143 | 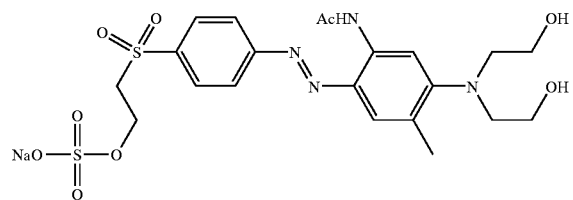 |
| 144 | 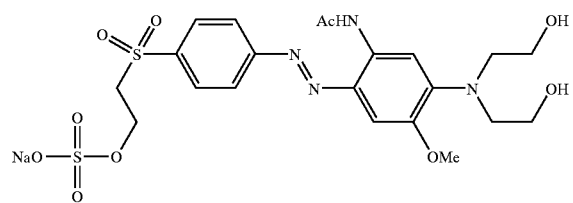 |
| 145 | 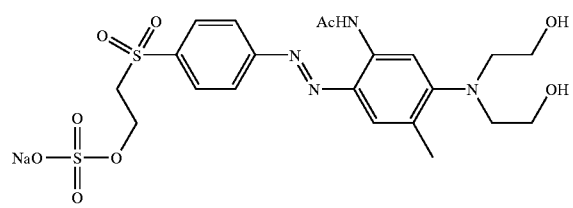 |
| 146 | 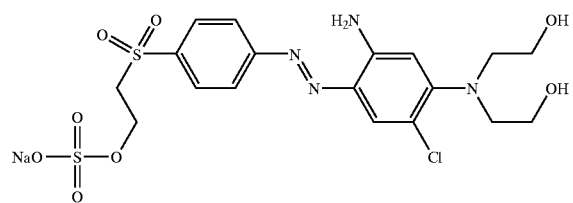 |

-continued
147 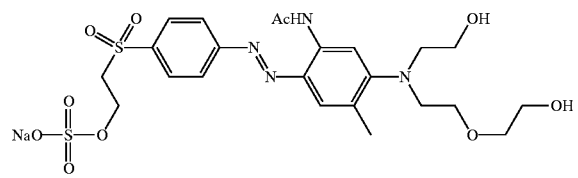
148 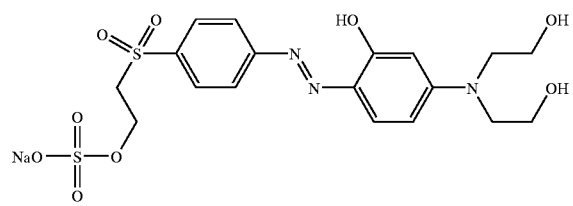
149 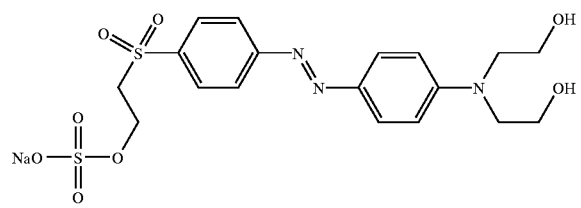
150 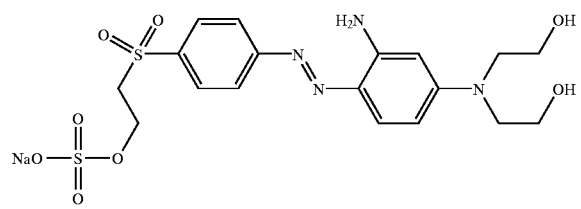
151 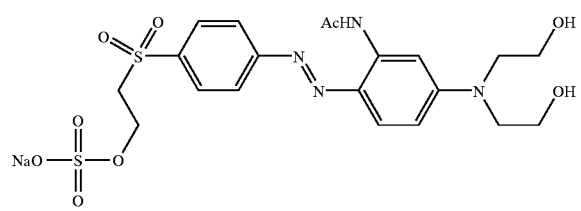
152 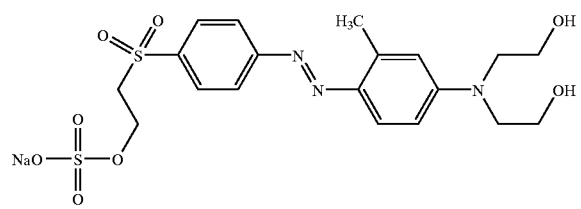
153 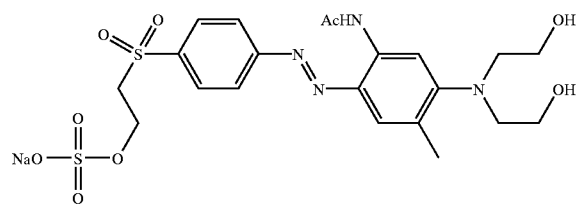

-continued
154 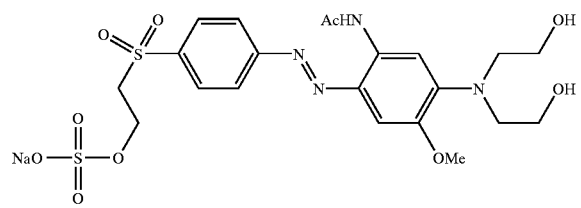
155 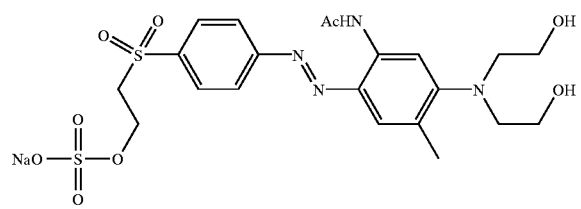
156 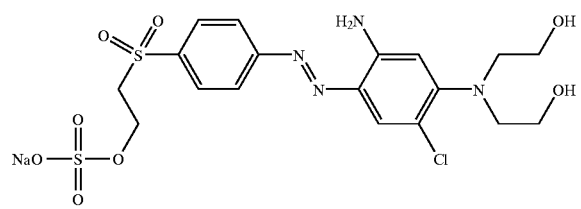
157 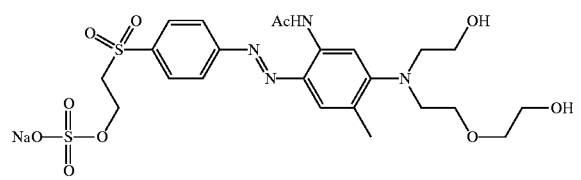
158 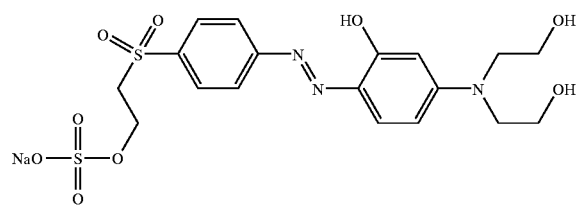
159 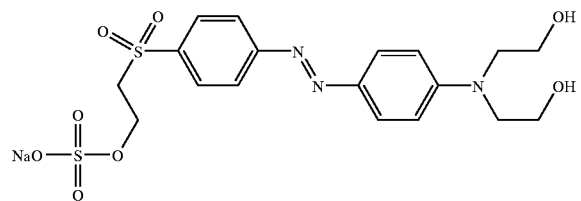
160 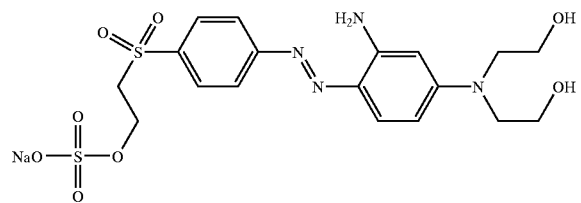

-continued
| 161 | 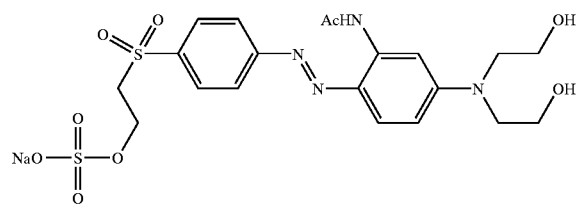 |
| 162 | 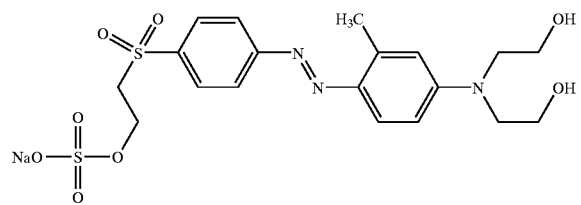 |
| 163 | 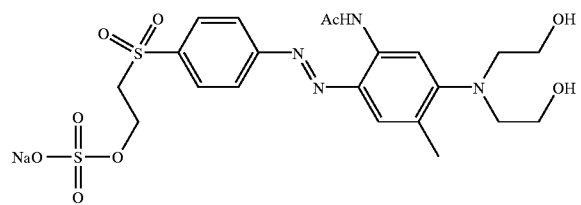 |
| 164 | 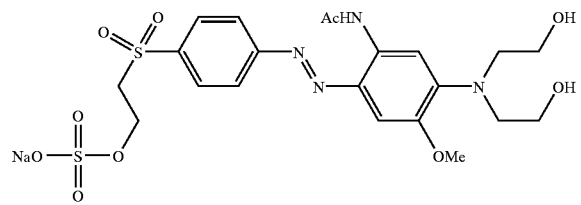 |
| 165 | 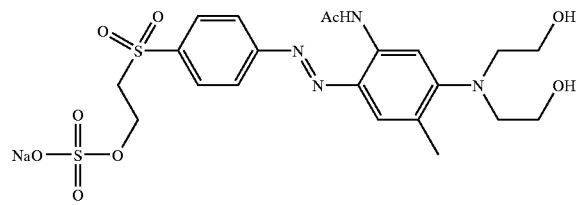 |
| 166 | 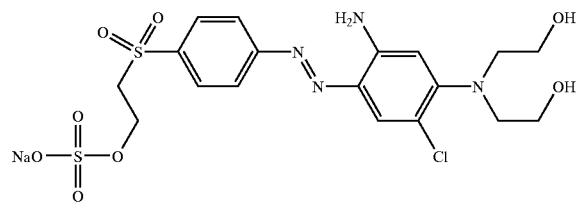 |
| 167 | 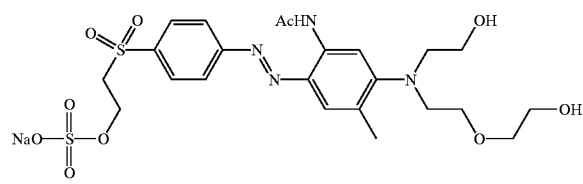 |

168 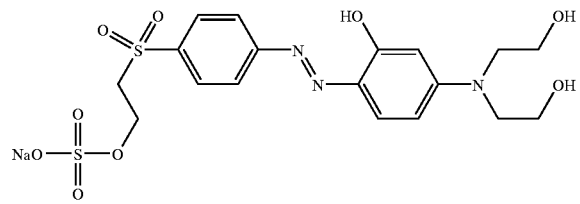
169 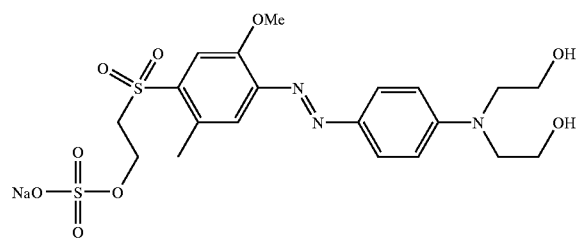
170 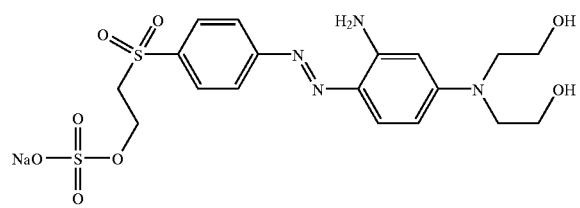
171 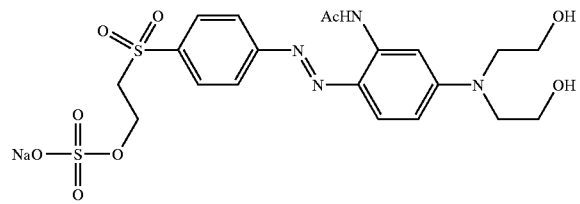
172 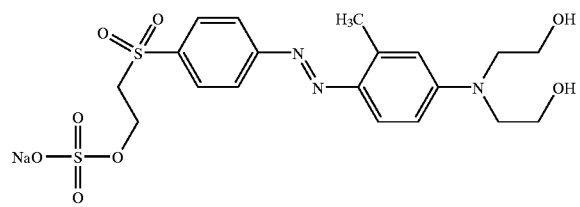
173 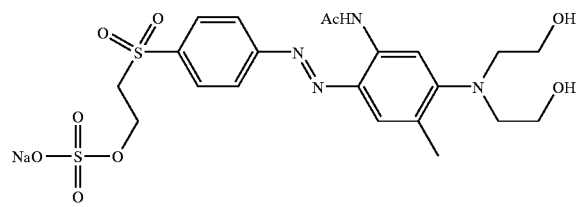
174 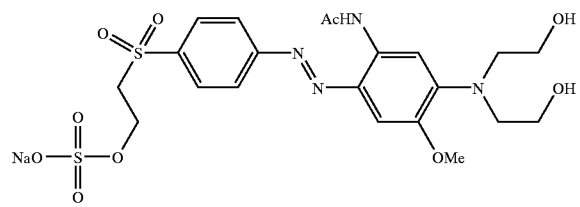

-continued
175 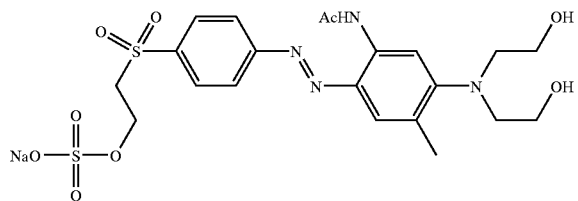
176 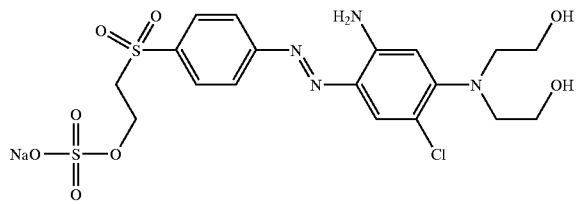
177 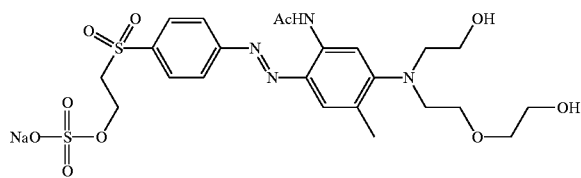
| Example | shading dye | Ratio |
|---|---|---|
| 4 | | 75:25 |
| 5 | | 70:30 |
| 6 | | 80:20 |
| 7 | | 75:25 |
| 8 | | 70:30 |
| 9 | | 80:20 |
| 10 | | 75:25 |
| 11 | | 70:30 |
| 12 | | 80:20 |
| 13 | | 75:25 |
| 14 | | 70:30 |
| 15 | | 80:20 |
| 16 | | 75:25 |
| 17 | | 70:30 |
| 18 | | 80:20 |
| 19 | | 77.5:22.5 |
| 20 | | 77.5:22.5 |
| 21 | | 75:25 |
| 22 | | 70:30 |
| 23 | | 80:20 |
| 24 | | 75:25 |
| 25 | | 70:30 |
| 26 | | 80:20 |
| 27 | | 75:25 |
| 28 | | 70:30 |
| 29 | | 80:20 |
| 30 | | 75:25 |
| 31 | | 70:30 |
| 32 | | 80:20 |
| 33 | | 75:25 |
| 34 | | 70:30 |
| 35 | | 80:20 |
| 36 | | 75:25 |
| 37 | | 70:30 |
| 38 | | 80:20 |
| 39 | | 77.5:22.5 |
| 40 | | 77.5:22.5 |
| 41 | | 75:25 |
| 42 | | 70:30 |
| 43 | | " |
| 44 | | " |
| 45 | | " |
| 46 | | " |
| 47 | | " |
| 48 | | " |
| 49 | | " |
| 50 | | " |

-continued
| | |
|---|---|
| 51 | " |
| 52 | " |
| 53 | " |
| 54 | " |
| 55 | " |
| 56 | " |
| 57 | " |
| 58 | " |
| 59 | " |
| 60 | " |
| 61 | 75:25 |
| 62 | 70:30 |
| 63 | " |
| 64 | " |
| 65 | " |
| 66 | " |
| 67 | " |
| 68 | " |
| 69 | " |
| 70 | " |
| 71 | " |
| 72 | " |
| 73 | " |
| 74 | " |
| 75 | " |
| 76 | " |
| 77 | " |
| 78 | " |
| 79 | " |
| 80 | " |
| 81 | 75:25 |
| 82 | 70:30 |
| 83 | " |
| 84 | " |
| 85 | " |
| 86 | " |
| 87 | " |
| 88 | " |
| 89 | " |
| 90 | " |
| 91 | " |
| 92 | " |
| 93 | " |
| 94 | " |
| 95 | " |
| 96 | " |
| 97 | " |
| 98 | " |
| 99 | " |
| 100 | " |
| 101 | 70:30 |
| 102 | " |
| 103 | " |
| 104 | " |
| 105 | " |
| 106 | " |
| 107 | 80:20 |
| 108 | 70:30 |
| 109 | 75:25 |
| 110 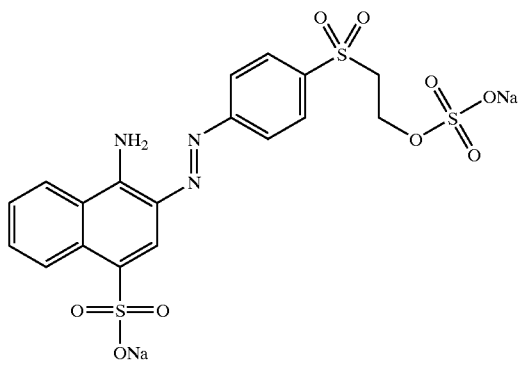 | 65:20:15 |
| 111 " | 75:15:10 |

-continued

| | | |
|---|---|---|
| 112 | " | 85:10:15 |
| 113 | " | 70:20:10 |
| 114 | (structure) | 75:15:10 |
| 115 | " | " |
| 116 | " | " |
| 117 | " | " |
| 118 | (structure) | " |
| 119 | " | 75:20:5 |
| 120 | " | 73:12:10 |
| 121 | (structure) | 65:20:15 |
| 122 | " | 75:15:10 |
| 123 | " | 85:10:15 |
| 124 | " | 70:20:10 |
| 125 | (structure) | 70:15:15 |

-continued
| | | |
|---|---|---|
| 129 | 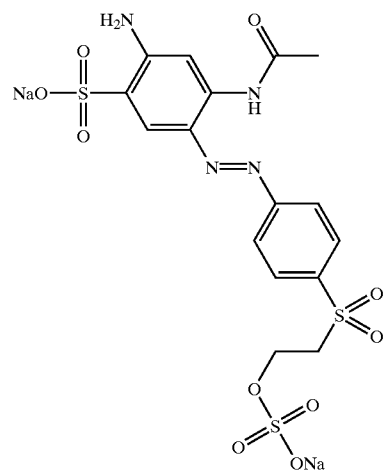 | " |
| 130 | " | 75:20:5 |
| 131 | 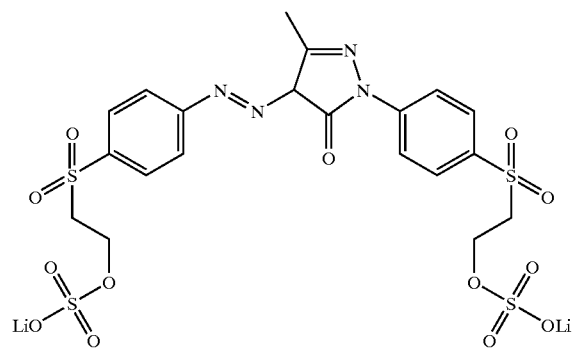 | 65:20:15 |
| 132 | " | 75:15:10 |
| 133 | " | 85:10:15 |
| 134 | " | 70:20:10 |
| 135 | 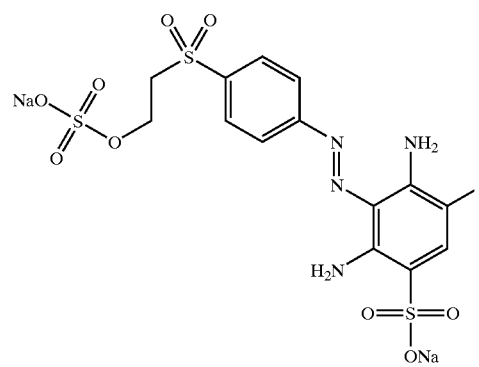 | 70:15:15 |

-continued
| | | |
|---|---|---|
| 136 | 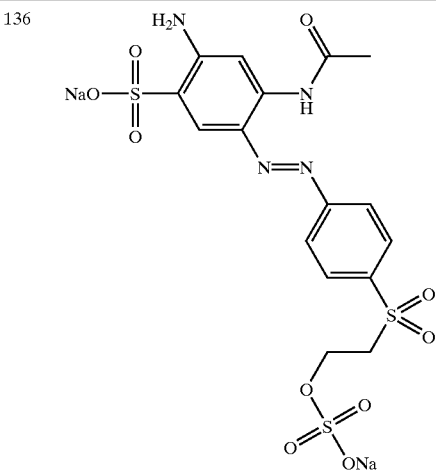 | " |
| 137 | " | 75:20:5 |
| 138 | | 75:25 |
| 139 | | " |
| 140 | | " |
| 141 | | " |
| 142 | | " |
| 143 | | " |
| 144 | | " |
| 145 | | 80:20 |
| 146 | | 70:30 |
| 147 | | 75:25 |
| 148 | | 77:23 |
| 149 | | " |
| 150 | | " |
| 151 | | " |
| 152 | | " |
| 153 | | " |
| 154 | | " |
| 155 | | 80:20 |
| 156 | | 70:30 |
| 157 | | 75:25 |
| 158 | | 77.5:22.5 |
| 159 | | " |
| 160 | | " |
| 161 | | " |
| 162 | | " |
| 163 | | " |
| 164 | | " |
| 165 | | 80:20 |
| 166 | | 70:30 |
| 167 | | 75:25 |
| 168 | | " |
| 169 | | " |
| 170 | | " |
| 171 | | " |
| 172 | | " |
| 173 | | " |
| 174 | | " |

-continued

| | |
|---|---|
| 175 | 80:20 |
| 176 | 70:30 |
| 177 | 75:25 |

What is claimed is:

1. A dye mixture comprising at least one dyestuff of the general formula (1)

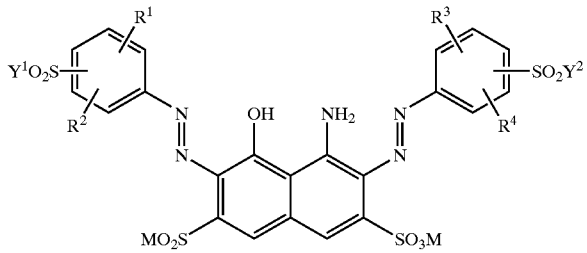

(1)

and at least one dyestuff of the general formula (2)

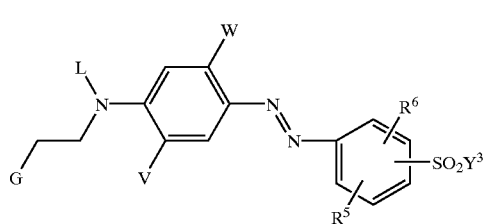

(2)

where
- M is an alkali metal, an ammonium or the equivalent of an alkaline earth metal;
- $Y^1$, $Y^2$ and $Y^3$ are independently ethenyl or a grouping of the formula —$CH_2CH_2Z$,
  where
  - Z is an alkali-eliminable grouping selected from sulfato, chloro, thiosulfato, phosphate, ($C_2$–$C_5$)-alkanolyoxy, sulfobenzoyloxy or p-toluylsulfonyloxy;
- $R^1$, $R^2$, $R^3$, $R^4$, $R^5$ and $R^6$ are independently hydrogen, ($C_1$–$C_4$)-alkyl, ($C_1$–$C_4$)-alkoxy, sulfo or chloro;
- W is hydrogen, chloro, bromo, nitro, amino, acetamido, benzamido, ($C_1$–$C_4$)-alkyl, ($C_1$–$C_4$)-alkoxy, hydroxy, ureido or ($C_2$–$C_4$)-alkanoyl;
- V is hydrogen, chloro, bromo, nitro, amino, acetamido, benzamido, ($C_1$–$C_4$)-alkyl, ($C_1$–$C_4$)-alkoxy, hydroxy, ureido or ($C_2$–$C_4$)-alkanoyl;
- L is hydrogen, methyl, ethyl or is ethyl which is substituted in the β-position by G;
- G is cyano, hydroxy, sulfo, sulfato, phosphate, acetyloxy or a residue of a lower polyethylenepolyether.

2. A dye mixture as claimed in claim 1, which comprises from 60 to 99% by weight of one or more dyestuffs of the general formula (1) and from 1 to 40% by weight of one or more dyestuffs of the general formula (2), based on the weight of the dye mixture.

3. A dye mixture as claimed in claim 1, which comprises from 65 to 90% by weight of one or more dyestuffs of the general formula (1) and from 10 to 35% by weight of one or more dyestuffs of the general formula (2), based on the weight of the dye mixture.

4. A dye mixture as claimed in claim 1, wherein $R^1$ is hydrogen, methoxy or sulfo, $R^2$ is hydrogen or methoxy, $R^3$ and $R^4$ are hydrogen and $R^5$ and $R^6$ are hydrogen, methoxy or sulfo.

5. A dye mixture as claimed in claim 1, wherein W is hydrogen, chloro, nitro, amino, acetamido, methyl or ureido, V is hydrogen or methoxy, L is hydrogen, ethyl, β-sulfatoethyl, β-hydroxyethyl or β-cyanoethyl and G is sulfato, hydroxy or cyano.

6. A dye mixture as claimed in claim 1, which further comprises one or more dyestuffs of the general formulae (3a) or (3b) or both

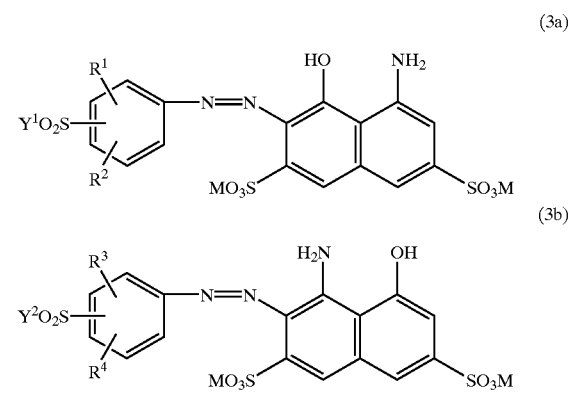

in which $R^1$, $R^2$, $R^3$, $R^4$, M, $Y^1$ and $Y^2$ are defined as given in claim 1.

7. A dye mixture as claimed in claim 1, which further comprises additional dyestuffs acting as shading components.

8. A dye mixture as claimed in claim 7, wherein the shading components are dyestuffs of the general formulae (4) to (10)

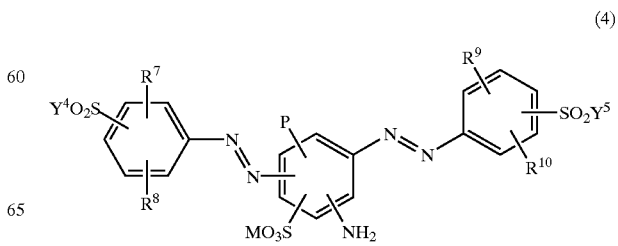

(4)

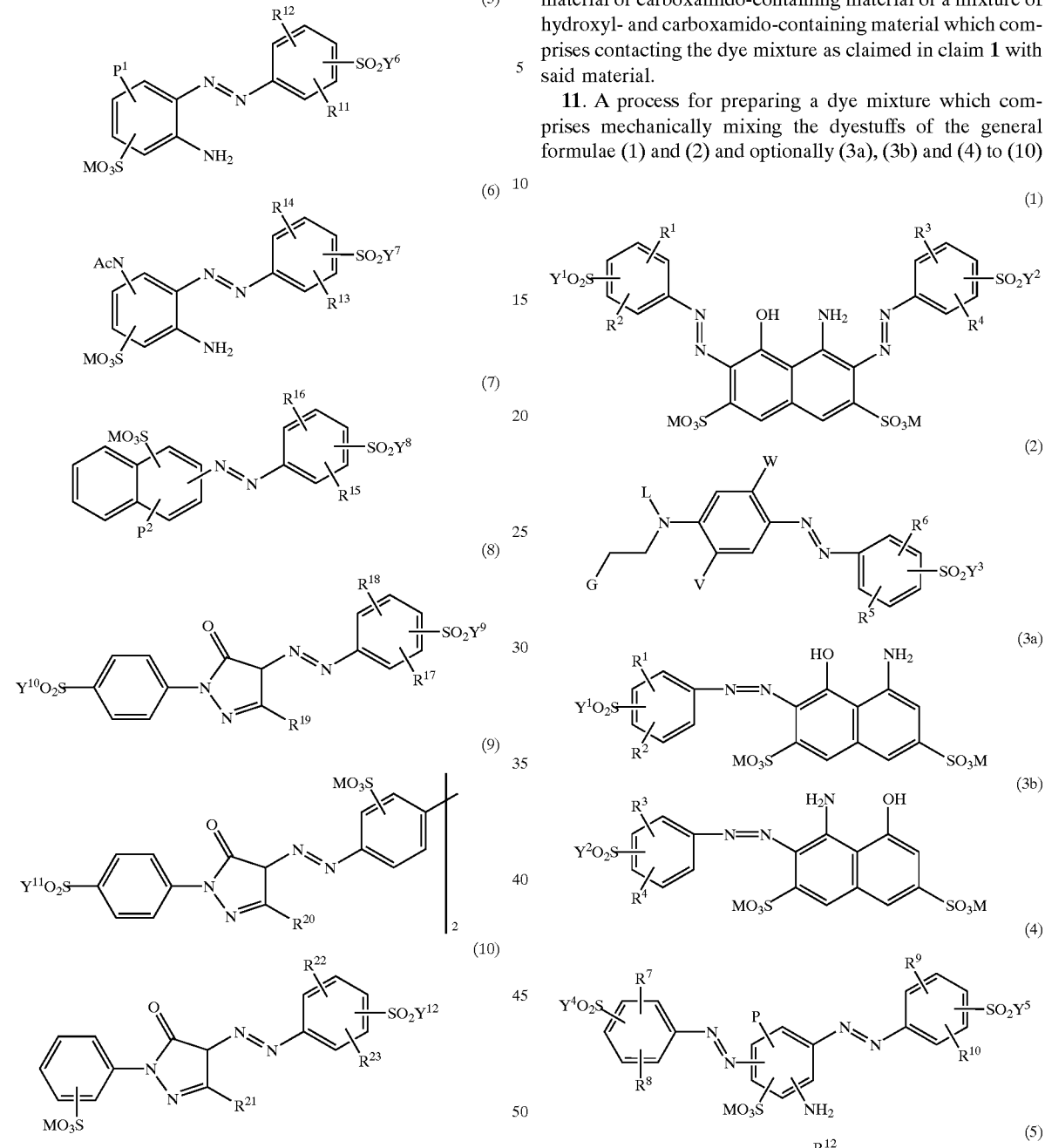
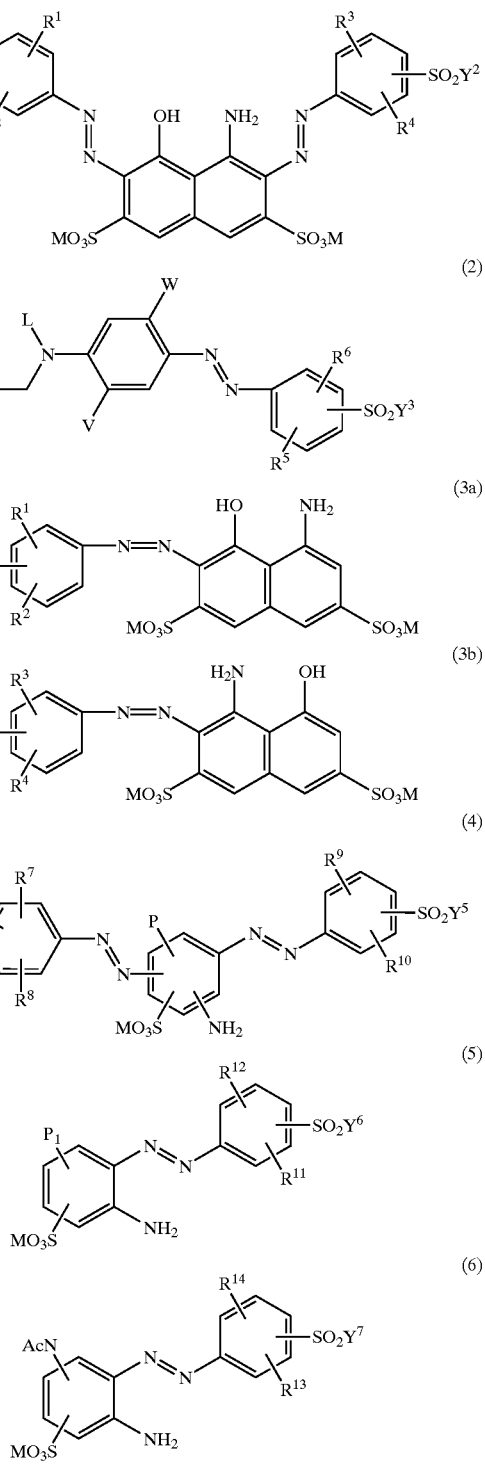

10. A process for dyeing and printing hydroxyl-containing material or carboxamido-containing material or a mixture of hydroxyl- and carboxamido-containing material which comprises contacting the dye mixture as claimed in claim 1 with said material.

11. A process for preparing a dye mixture which comprises mechanically mixing the dyestuffs of the general formulae (1) and (2) and optionally (3a), (3b) and (4) to (10)

where
M is an alkali metal an ammonium or the equivalent of an alkaline earth metal;
$Y^4$ to $Y^{12}$ independently have one of the meanings of $Y^1$;
$R^7$ to $R^{18}$ and $R^{22}$ and $R^{23}$ independently have one of the meanings of $R^1$;
$R^{19}$ to $R^{21}$ are independently $(C_1-C_4)$-alkyl, —COOH or —COOR$^{24}$,
where
$R^{24}$ is $(C_1-C_4)$-alkyl; and
P to $P^2$ are independently hydroxy, $(C_1-C_4)$-alkoxy, amino, $(C_1-C_4)$-alkylamino or di-$(C_1-C_4)$-alkylamino.

9. A dye mixture as claimed in claim 7, wherein the shading component is contained in amounts of 0.5 to 20% by weight, based on the weight of the dye mixture.

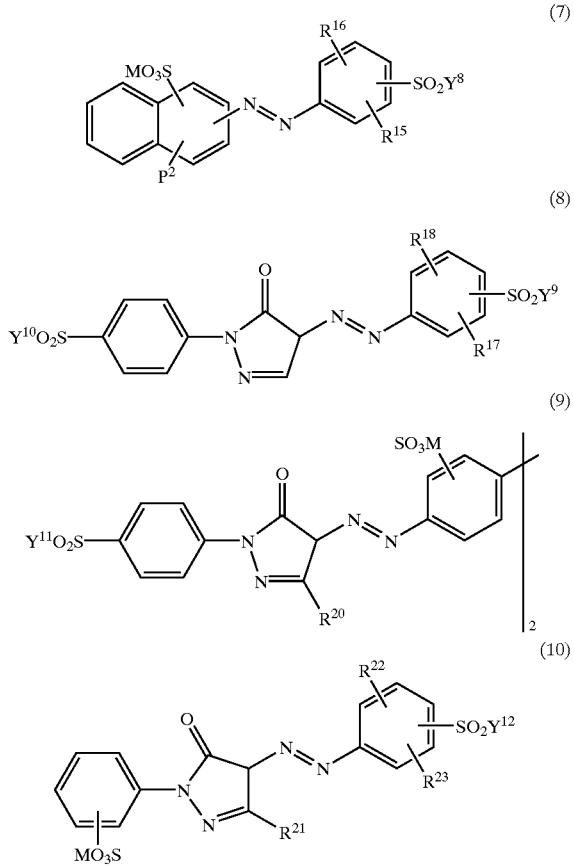

wherein
M is an alkali metal, an ammonium or the equivalent of an alkaline earth metal;

$Y^1$, $Y^2$ and $Y^3$ are independently ethenyl or a grouping of the formula —CH$_2$CH$_2$Z,
wherein
Z is an alkali-eliminable grouping selected from sulfato, chloro, thiosulfato, phosphate, (C$_2$–C$_5$)-alkanolyoxy, sulfobenzoyloxy or p-toluylsulfonyloxy;

$R^1$, $R^2$, $R^3$, $R^4$, $R^5$ and $R^6$ are independently hydrogen, (C$_1$–C$_4$)-alkyl, (C$_1$–C$_4$)-alkoxy, sulfo or chloro W is hydrogen, chloro, bromo, nitro, amino, acetamido, benzamido, (C$_1$–C$_4$)-alkyl, (C$_1$–C$_4$)-alkoxy, hydroxy, ureido or (C$_2$–C$_4$)-alkanoyl;

V is hydrogen, chloro, bromo, nitro, amino, acetamido, benzamido, (C$_1$–C$_4$)-alkyl, (C$_1$–C$_4$)-alkoxy, hydroxy, ureido or (C$_2$–C$_4$)-alkanoyl;

L is hydrogen, methyl, ethyl or is ethyl which is substituted in the β-position by G;

G is cyano, hydroxy, sulfo, sulfato, phosphato, acetyloxy or a residue of a lower polyethylenepolyether, $Y^4$ to $Y^{12}$ independently have one of the meanings of $Y^1$;

$R^7$ to $R^{18}$ and $R^{22}$ and $R^{23}$ independently have one of the meanings of $R^1$;

$R^{19}$ to $R^{21}$ are independently (C$_1$–C$_4$)-alkyl, —COOH or —COOR$^{24}$,
wherein
$R^{24}$ is (C$_1$–C$_4$)-alkyl; and P to P$^2$ are independently hydroxy, (C$_1$–C$_4$)-alkoxy, amino, (C$_1$–C$_4$)-alkylamino or di-(C$_1$–C$_4$)-alkylamino.

* * * * *

UNITED STATES PATENT AND TRADEMARK OFFICE
CERTIFICATE OF CORRECTION

PATENT NO.   : 6,464,734 B1
DATED        : October 15, 2002
INVENTOR(S)  : Steckelberg et al.

It is certified that error appears in the above-identified patent and that said Letters Patent is hereby corrected as shown below:

Column 55,
Line 45, delete "phosphate" and insert -- phosphato --.

Column 60,
Line 8, delete "phosphate" and insert -- phosphato --.

Signed and Sealed this

Fourth Day of February, 2003

JAMES E. ROGAN
*Director of the United States Patent and Trademark Office*